United States Patent
Suino

(10) Patent No.: US 8,885,933 B2
(45) Date of Patent: Nov. 11, 2014

(54) IMAGE DATA PROCESSING DEVICE, IMAGE FORMING APPARATUS, AND RECORDING MEDIUM

(75) Inventor: Tooru Suino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 233 days.

(21) Appl. No.: 13/533,270

(22) Filed: Jun. 26, 2012

(65) Prior Publication Data

US 2013/0016902 A1 Jan. 17, 2013

(30) Foreign Application Priority Data

Jul. 13, 2011 (JP) ................. 2011-155057

(51) Int. Cl.
*G06K 9/34* (2006.01)
*G06K 9/00* (2006.01)
*G06K 15/02* (2006.01)
*H04N 1/64* (2006.01)
*G06T 11/60* (2006.01)
*H04N 1/407* (2006.01)

(52) U.S. Cl.
CPC ..... *G06K 15/189* (2013.01); *G06T 2207/10024* (2013.01); *H04N 1/642* (2013.01); *G06T 2207/20064* (2013.01); *G06T 11/60* (2013.01); *H04N 1/4072* (2013.01); *G06K 15/1878* (2013.01)
USPC .......................................... 382/164; 382/162

(58) Field of Classification Search
CPC ............. G06K 15/1878; G06K 15/189; G06T 7/0081; G06T 2207/10024; G06T 2207/20064
USPC ................................................. 382/162, 164
See application file for complete search history.

(56) References Cited

U.S. PATENT DOCUMENTS

| 7,027,660 B2 * | 4/2006 | Hersch et al. ................. 382/257 |
| 7,302,104 B2 | 11/2007 | Suino |
| 7,330,596 B2 | 2/2008 | Suino et al. |
| 7,355,755 B2 | 4/2008 | Suino et al. |
| 7,369,713 B2 | 5/2008 | Suino |
| 7,372,999 B2 | 5/2008 | Oneda et al. |
| 7,386,176 B2 | 6/2008 | Oneda et al. |
| 7,423,781 B2 | 9/2008 | Morimoto et al. |
| 7,474,792 B2 | 1/2009 | Kadowaki et al. |
| 7,522,778 B2 | 4/2009 | Suino et al. |
| 7,542,611 B2 | 6/2009 | Yano et al. |
| 7,609,897 B2 | 10/2009 | Oneda et al. |
| 7,609,899 B2 | 10/2009 | Suino |
| 7,667,713 B2 | 2/2010 | Suino et al. |
| 7,970,206 B2 * | 6/2011 | Harris et al. ................. 382/162 |
| 8,031,941 B2 | 10/2011 | Suino |

(Continued)

FOREIGN PATENT DOCUMENTS

JP 2007-235679 A 9/2007

*Primary Examiner* — Kanjibhai Patel
(74) *Attorney, Agent, or Firm* — Harness, Dickey & Pierce, P.L.C.

(57) ABSTRACT

An image data processing device processes structured image data including background image data representing a background image, foreground image data representing a foreground image indicating a color and a gross shape, and mask data representing a mask image specifying a prescribed area of the foreground image to be overlaid on the background image. The image data processing device lightens a shade of the background image by applying background color lightening processing to the background data, and lightens a shade of the foreground image less than the shade of the background image by applying foreground color lightening processing to the foreground data.

23 Claims, 28 Drawing Sheets

(56) References Cited

U.S. PATENT DOCUMENTS

| | | |
|---|---|---|
| 2003/0007186 A1 | 1/2003 | Suino et al. |
| 2003/0218776 A1 | 11/2003 | Morimoto et al. |
| 2004/0013310 A1 | 1/2004 | Suino et al. |
| 2004/0136596 A1 | 7/2004 | Oneda et al. |
| 2004/0146209 A1 | 7/2004 | Kadowaki et al. |
| 2004/0151385 A1 | 8/2004 | Oneda et al. |
| 2004/0163038 A1 | 8/2004 | Yano et al. |
| 2005/0031212 A1 | 2/2005 | Suino |
| 2005/0088669 A1 | 4/2005 | Suino et al. |
| 2005/0105807 A1 | 5/2005 | Suino et al. |
| 2005/0265608 A1 | 12/2005 | Suino |
| 2006/0056509 A1 | 3/2006 | Suino et al. |
| 2007/0258660 A1 | 11/2007 | Suino |
| 2008/0025605 A1 | 1/2008 | Suino |
| 2008/0131013 A1 | 6/2008 | Suino et al. |
| 2008/0152244 A1 | 6/2008 | Suino |
| 2008/0212884 A1 | 9/2008 | Oneda et al. |
| 2009/0046939 A1 | 2/2009 | Sakuyama et al. |
| 2009/0284627 A1* | 11/2009 | Bando et al. .................. 348/273 |
| 2012/0075331 A1* | 3/2012 | Mallick et al. ................ 345/594 |

\* cited by examiner

LAYER NUMBER = 0

LAYER NUMBER = 1

LAYER NUMBER = 2

LAYER NUMBER = 3

DECODING THE MASK

SCALING THE MASK

CLIPPING THE MASK

POSITIONING THE MASK

WINDOW CLIPPING THE MASK

IMAGE DATA PROCESSING DEVICE, IMAGE FORMING APPARATUS, AND RECORDING MEDIUM

CROSS-REFERENCE TO RELATED APPLICATION

This patent application is based on and claims priority pursuant to 35 U.S.C. §119 to Japanese Patent Application No. 2011-155057, filed on Jul. 13, 2011 in the Japan Patent Office, the entire disclosure of which is hereby incorporated by reference herein.

BACKGROUND OF THE INVENTION

1. Field of the Invention

The present invention relates to an image data processing device capable of applying a background color lightening process to background data included in structured image data for lightening a shade of a background image.

2. Description of the Background Art

Conventionally, structured image data, such as MRC (Mixed Raster Contents), JPM (JPEG2000 Multi-Layer), etc., is known as one type of compressed image data format to compress and save still image data. The structured image data represents an image with a background and a foreground, such as characters, etc., located in front of the background. The structured image data includes three data pieces, background data, foreground data, and mask data. The background data is compressed data of a background image. The foreground data is compressed data of a foreground image indicating a color and a gross shape of the foreground. The mask data is compressed data of a mask image indicating a prescribed region of the foreground image overlying the background image. For example, when a mask image included in the structured image data has the shape of the letter "A" at a center of a sheet and a foreground image included therein has a green rectangular shape at the center of the sheet, only the green rectangular shape region of the foreground image is overlaid on the background image corresponding to the shape of the letter "A". In general, structured image data can be compressed at a high rate without excessively deforming the shape of the foreground by compressing image data of the foreground separately from that of background.

As a technique for handling the structured image data, an image data processing device described in Japanese Patent Application Publication No. 2007-235679 (JP-2007-235679-A) is known. With the technique, the image data processing device applies a background color lightening process to the background data to lighten a shade of a background image. As a result, a consumption amount of toner used as a colorant can be reduced when an image expressed by the structured image data is formed by an image forming device without degrading the legibility of text.

However, in such an image data processing device, a problem is that a toner consumption amount cannot be effectively reduced when an image including a foreground having a relatively high coverage ratio due to inclusion of a large amount of text or a large-size text.

BRIEF SUMMARY OF THE INVENTION

Accordingly, the present invention provides a novel image data processing device that processes structured image data including background image data representing a background image, foreground image data representing a foreground image indicating a color and a gross shape, and mask data representing a mask image specifying a prescribed area of the foreground image to be overlaid on the background image. The image data processing device lightens a shade of the background image by applying background color lightening processing to background data, and lightens a shade of the foreground image less than the shade of the background image by applying foreground color lightening processing to the foreground data.

In another aspect of the present invention, the background image and the foreground image are lightened by increasing a brightness of the background and foreground images.

In yet another aspect of the present invention, the shades of the background and the foreground images are lightened by increasing a brightness while decreasing a color difference of those.

In yet another aspect of the present invention, the background color lightening process and the foreground color lightening processing are executed in such a manner that as an original brightness decreases a growth rate of a correspondingly increased brightness increases and as an original color difference increases a growth rate of a correspondingly decreased color difference decreases.

In yet another aspect of the present invention, the brightness of the foreground image and the background image are increased by increasing a brightness of pixel data.

In yet another aspect of the present invention, multiple color coefficient series are generated per frequency band by applying discrete wavelet transformation to each of the background data and foreground data. A brightness coefficient increasing process is applied only to a brightness coefficient series corresponding to the lowest frequency band while the brightness coefficient is corrected under a rule that as an original brightness coefficient positively increases a growth rate of the increased brightness coefficient decreases.

In yet another aspect of the present invention, multiple normalized color coefficient series are generated per frequency band in a normalized state by applying discrete wavelet transformation to each of the background data and foreground data. A brightness coefficient increasing process is applied only to a normalized color coefficient series corresponding to the lowest frequency band. A normalizing denominator is increased above a standard value when the brightness coefficient is inversely normalized under a rule that as an original brightness coefficient positively increases a growth rate of the increased brightness coefficient decreases.

In yet another aspect of the present invention, image data includes multiple groups of color coefficient series generated per frequency band by repeatedly applying discrete wavelet transformation to each of the background data and foreground data, and multiple groups of normalized color coefficient series generated in a normalized state per frequency band by repeatedly applying discrete wavelet transformation to each of the background data and foreground data. A brightness coefficient increasing process is applied only to a set of a coefficient series higher than a prescribed layer.

In yet another aspect of the present invention, multiple color coefficient series are generated per frequency band by applying discrete wavelet transformation to each of the background data and foreground data. A color difference coefficient decreasing process is applied only to a color coefficient series corresponding to the lowest frequency band, and an absolute value of a color difference coefficient is decreased under a rule that as an absolute value of an original color coefficient increases a reduction rate of the decreased absolute brightness coefficient increases.

In yet another aspect of the present invention, multiple normalized color coefficient series are generated per frequency band in a normalized state by applying discrete wavelet transformation to each of the background data and foreground data. A color difference coefficient decreasing process is applied only to a normalized color coefficient series corresponding to the lowest frequency band, and an absolute normalizing denominator value is increased more than a standard value when a color coefficient is inversely normalized under a rule that as an absolute value of an original color difference coefficient increases a reduction rate of the decreased brightness coefficient increases.

In yet another aspect of the present invention, image data includes multiple groups of color coefficient series generated per frequency band by repeatedly applying discrete wavelet transformation to each of the background data and foreground data, and multiple groups of normalized color coefficient series generated in a normalized state per frequency band by repeatedly applying discrete wavelet transformation to each of the background data and foreground data. A color coefficient decreasing process is applied only to a coefficient series group higher than a prescribed layer.

In yet another aspect of the present invention, the controller switches from a first mode in which only the background color lightening processing is executed to a second mode in which both the foreground and background color lightening processes are executed vice versa in accordance with an instruction from a user.

In yet another aspect of the present invention, an image formation apparatus comprises a structured image data acquisition device to acquire structured image data, an image data processing device to give the above-described process to the structured image data acquired by the structured image data acquisition device, and an image forming device to form an image based on the structured image data acquired by the structured image data acquisition device.

In yet another aspect of the present invention, a computer readable medium storing program to operate a computer to execute the steps of generating structured image data based on background and foreground data representing background and foreground images, respectively, and mask data representing a mask image specifying a prescribed area of the foreground image to be overlaid on the background image to indicate a color and a gross shape, lightening a shade of a background image by applying a background color lightening process to background data representing the background image, and lightening a shade of the foreground image less than a shade of the background image by applying a foreground color lightening process to the foreground data.

BRIEF DESCRIPTION OF THE DRAWINGS

A more complete appreciation of the present invention and many of the attendant advantages thereof will be more readily obtained as the same becomes better understood by reference to the following detailed description when considered in connection with the accompanying drawings, wherein.

DETAILED DESCRIPTION OF THE INVENTION

Figure 1:
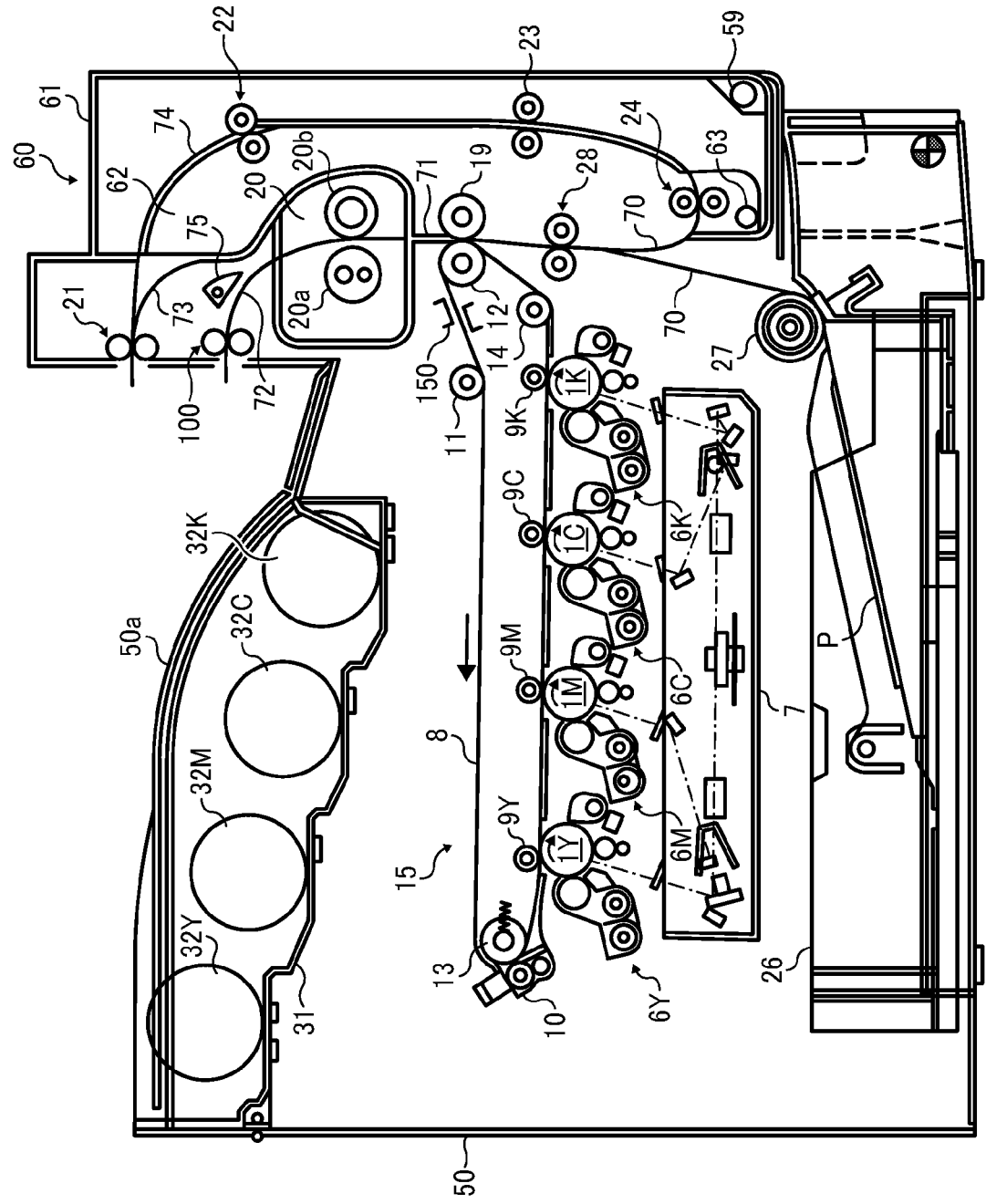
FIG. 1 is a schematic view illustrating a printer according to one embodiment of the present invention.
Figure 2:
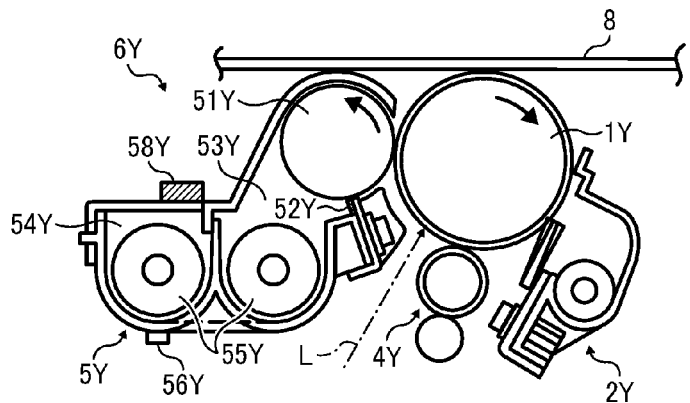
FIG. 2 is an enlarged view illustrating a configuration of a Y (yellow) image forming unit provided in the printer.

Referring now to the drawings, wherein like reference numerals designate identical or corresponding parts throughout the several views thereof and in particular to FIG. 1, a configuration of a first embodiment of an electro-photographic printer (herein after simply referred to as a printer) as an image forming apparatus adopting the present invention is described. Specifically, as shown, this printer is provided with four image forming units 6Y, 6M, 6C, and 6K to generate toner images of yellow, magenta, cyan, and black (herein below simply referred to as Y, M, C, and K). These units use toner of a different color as colorant from each other but otherwise have a similar configuration, and are replaced upon reaching the end of their service lives. When the image forming unit 6Y for forming the Y-color toner image is typically described, as shown in FIG. 2, the image forming unit includes a drum state photoconductor 1Y as an image bearer, a drum cleaning device 2Y, a charge removing device (not shown), a charging device 4Y, and a developing device 5Y or the like. The image forming unit 6Y is detachably attached to the printer as a unit.

The charging device 4Y uniformly charges a surface of the photoconductor 1Y rotated clockwise in the drawing by a driving device not shown in the drawing. The surface of the photoconductor 1Y with the uniform charge is scanned by a laser light L and bears an electrostatic latent image of a Y-color thereon. The electrostatic latent image Y is developed by the developing device 5Y into a Y-color toner image using Y-color developing agents containing a magnetic carrier and Y-color toner. Subsequently, the Y-color toner image is transferred onto an intermediate transfer belt 8 described later in a primary transfer process. The drum cleaning device 2Y eliminates a transfer residual toner sticking to a surface of the photoconductor 1Y after completing the primary transfer process. Further, the above-described charge removing device neutralizes residual charge on the photoconductor 1Y remaining after cleaning. With the above-described charge neutralization, the surface of the photoconductor 1Y is initialized and is prepared for the next image formation. In the other color image formation units (6M, C, K), toner images (M, C, K) are formed on the photoconductor (1M, C, K) as well and are superimposed on the intermediate transfer belt 8 during the primary transfer process.

The developing device 5Y has a developing roller 51Y partially exposed from an opening formed on its casing. Further, the developing unit 5Y also includes a pair of conveyance screws 55Y disposed in parallel to each other, a doctor blade 52Y, and a toner sensor 56Y or the like.

In the casing of the developing unit 5Y, Y-color developing agents containing a magnetic carrier and the Y-color toner, not shown, are stored. The Y-color developing agents are stirred and conveyed by the pair of conveyance screws 55Y and consequently triboelectrically charged thereby, and are retained on a surface of the developing roller 51Y. The Y-color developing agents are flattened by a doctor blade 52Y to have a layer of a prescribed thickness, and are further conveyed to a developing area facing the photoconductor 1Y for Y-color use. Then, the Y-color toner is attracted to an electrostatic latent image borne on the photoconductor 1Y. With such attraction, a Y-color toner image is formed on the photoconductor 1Y. In the developing unit 5Y, the Y-color developing agents remaining after consumption of Y-color toner in the developing process are sent back to the casing as the developing roller 51Y rotates.

Between the pair of transportation screws 55Y, a partition wall is located. By the partition wall, a first supply unit 53Y disposed on the right side in the drawing accommodating the developing roller 51 and the transportation screw 55Y or the like and a second supply unit 54Y disposed on the left side in the drawing accommodating the conveyance screw 55Y are divided within the casing. The conveyance screw 55Y on the right in the drawing is driven and rotated by a driving device, not shown in the drawing, and supplies Y-color developing agents stored in the first supply development 53Y to the developing roller 51Y by conveying those from a front side to a rear side in the drawing. The Y-color developing agents conveyed by the right side conveyance screw 55Y in the drawing to a position near an end of the first supply unit 53Y enter the second supply unit 54Y through an opening, not shown, formed on the above-described partition wall. In the second supply unit 54Y, the left side conveyance screw 55Y in the drawing driven and rotated by a driving device, not shown, conveys the Y-color developing agents sent from the first supply development unit 53Y to an opposite direction to that the right side conveyance screw 55Y conveys. The Y-color developing agents conveyed until near the end of the second supply unit 54Y by the left side conveyance screw 55Y in the drawing return to the first supply unit 53Y through another opening, not shown, formed on the above-described partition wall.

The above-described toner sensor 56Y is mainly composed of a permeability magnetic sensor and is disposed on a wall of the second supply unit 54Y to output a voltage in accordance with a permeability of the Y-color developing agents passing it over. The permeability of two-component developing agents containing a magnetic carrier and toner shows a good correlation with toner density. Accordingly, the toner density sensor 56Y outputs a voltage in accordance with a density of the Y-color toner. The output voltage is sent to the control unit not shown in the drawing. The control unit has a RAM that contains a Y-color use Vtref serving as a target value for an output voltage sent from the toner density sensor 56Y. M-color use Vtref, C-color use Vtref, and K-color use Vtref data pieces are stored in the RAM as target values of output voltages sent from the toner density sensors, not shown, mounted on other developing units. The Y-color use Vtref is used in controlling and driving a Y-color use toner transfer device as described later in detail. Specifically, the above-described control unit controls driving of the Y-color use toner conveying device, not shown in the drawing, to supply Y-color toner into the second supply unit 54Y, so that an output voltage sent from the toner density sensor 56Y approximates the Y-color use Vtref. Due to such replenishment of toner, the density of Y-color toner in the developing agents stored in the development device 5Y is maintained within a prescribed range. Similar toner replenishment control is carried out in each of the developing devices of the remaining process units as well using M, C, and K-use toner conveying devices, respectively.

Back to FIG. 1, below the image forming units 6Y, 6M, 6C, and 6K, an optical writing unit 7 is arranged. The optical writing unit 7 serving as latent image formation device provides the photoconductors in the image forming units 6Y, 6M, 6C, and 6K with optical scanning by emitting a laser light L based on image information. By scanning with the light, multiple electrostatic latent images for Y, M, C, and K uses are formed on the photoconductors 1Y, 1M, 1C, and 1K, respectively. Furthermore, the optical writing unit 7 irradiates a laser light (L) from a light source to the photoconductors via multiple optical lenses and mirrors while diffusing it with a polygon minor driven and rotated by a motor to traverse the photoconductors thereon.

Further, a sheet containing device with a sheet containing cassette 26 and a feeding roller 27 or the like is disposed below the optical writing unit 7 in the drawing, the sheet containing cassette 26 contains multiple record sheets P as sheet like recording media. A sheet feeding roller 27 engages each of the topmost recording sheets. When the sheet feeding roller 27 is driven and rotated counterclockwise in the drawing by a driving device, not shown, the topmost recording sheet P is sent out toward a sheet supply path 70.

Near the end of the sheet supply path 70, a pair of registration rollers 28 is disposed. Although, both of the pair of registration rollers 28 rotate to sandwich the recording sheet P therebetween, they immediately stop their rotation once collectively gripping the recording sheet P. Both rollers restart rotating at an appropriate time and send out the recording sheet P toward the later described secondary transfer nip.

Above the image formation units 6Y, 6M, 6C, and 6K in the drawing, a transfer unit 15 is disposed including an intermediate transfer belt 8 stretched and circulated as an endless surface movement member. The transfer unit 15 further has a secondary transfer bias roller 19 and a cleaning device 10 other than the intermediate transfer belt 8. Further, four primary transfer bias rollers 9Y, 9M, 9C, and 9K, a driving roller 12, a cleaning backup roller 13, a secondary-transfer-nip entrance roller 14 are included in the transfer unit 15 as well. The intermediate transfer belt 8 endlessly is moved by rotation driving of the driving roller 12 counterclockwise in the drawing with it being wound around each of these seven rollers.

Each of the primary transfer bias rollers 9Y, 9M, 9C, and 9K sandwiches the endlessly moved intermediate transfer belt 8 together with each of the photoconductors 1Y, 1M, 1C, and 1K therebetween and forms a primary transfer nip thereon. To each of these primary transfer bias rollers, a primary transfer bias having an opposite polarity (e.g. positive) to that of toner is applied. All of rollers other than the primary transfer bias rollers 9Y, 9M, 9C, and 9K, are grounded electrically.

As the intermediate transfer belt 8 sequentially passes through the primary transfer nips for Y, M, C, and K uses, the Y, M, C, and K toner images on the photoconductors 1Y, 1M, 1C, and 1K are transferred and overlaid thereon in each of the primary transfer processes. Hence, a four-color superposed toner image (hereinafter referred to as a four-color toner image) is formed on the intermediate transfer belt 8.

The driving roller 12 sandwiches the intermediate transfer belt 8 together with the secondary transferal bias roller 19 contacting and separating therefrom and forms a secondary transfer nip thereon. The four color toner image formed on the intermediate transfer belt 8 is transferred onto a recording sheet P at the secondary transfer nip. Thus, a full-color toner image appears on a white and blank recording sheet P.

Some residual toner not transferred onto the recording sheet P adheres to the intermediate transfer belt 8 after passing through the secondary transfer nip. However, the residual toner is cleaned by the cleaning device 10. Further, the recording sheet P with the four color toner image transferred at once at the secondary transfer nip is sent to the fixing device 20 via a post transfer conveyance path 71.

In the fixing device 20, a fixing roller 20A having an internal heat source, such as a halogen lamp, etc., and a pressing roller 20b rotating and contacting the fixing roller 20A with a given pressure are provided to collectively form a fixing nip therebetween. Thus, the recording sheet P sent toward the fixing device 20 is pinched at the fixing nip with its unfixed toner image bearing surface tightly contacting the fixing roller 20A. Some toner in the toner image is then softened by heat and pressure, so that the full color image is fixed.

After leaving the fixing device 20, the recording sheet P with the full color image fixed in the fixing device 20 comes to reach a fork to a sheet exit path 72 and a sheet pre-inversion conveyance path 73. At this junction, a first switching nail 75 is pivotally disposed and switches a course of the recording sheet P. Specifically, by shifting a tip of the nail in a direction close to the pre-inversion conveyance path 73, the course of the recording sheet P is directed toward the sheet exit path 72. Otherwise, by shifting the tip of the nail toward a direction away from the pre-inversion conveyance path 73, the course of the recording sheet P is directed toward the pre-inversion conveyance path 73.

When the course toward the sheet exit path 72 is selected by the first switching nail 75, the record sheet P is ejected and stacked on a stack 50*a* disposed on an upper surface of the printer housing after passing through a pair of sheet exit rollers 100 disposed on the exit path 72. Whereas, when the course toward the pre-inversion sheet conveyance path 73 is selected by the first switching nail 75, the record sheet P enters a nip of a pair of reverse rollers 21 passing through the pre-inversion sheet conveyance path 73. When it sandwiches and conveys the recording sheet P towards the stack 50*a*, the pair of inversion rollers 21 reversely rotates right before a trailing end of the recording sheet P enters the nip. With such reversal rotation, the record sheet P is transported in an opposite direction to that previously conveyed, and the trailing end of the record sheets P enters the reverse conveyance path 74.

The inversion conveyance path 74 vertically extends curving downwardly, and includes a pair of first inversion conveyance rollers 22, a pair of second inversion conveyance rollers 23, and a pair of third reverse conveyance rollers 24. The recording sheet P is inverted upside down as sequentially conveyed through nips of these pair of rollers. The recording sheet P reversed upside down reaches the secondary transfer nip again after returning to the above-described sheet supply path 70. Subsequently, the recording sheet P enters the secondary transfer nip with its image non-supported surface tightly contacting the intermediate transfer belt 8, and a second four color toner image on the intermediate transfer belt 8 is transferred onto the image non-supported surface at once. The recording sheet P is stacked on the outside stack 50 after passing through the post transfer conveyance path 71, the fixing device 20, the sheet exit path 72, and the pair of sheet exit rollers 100. With like this reversed conveyance, a full-color image is formed on both sides of the record sheet P.

Between the transfer unit 15 and the stack 50 arranged above it, a bottle support 31 is disposed. The bottle support 31 accommodates multiple toner bottles 32Y, 32M, 32C, and 32K as toner containers storing Y, M, C, and K toner, respectively. The Y, M, C, and K toner particles stored in the toner bottles 32Y, 32M, 32C, and 32K, are supplied to the developing units 6Y, 6M, 6C, and 6K in the image formation units upon need by a toner transfer device, not shown, respectively. These toner bottles 32Y, 32M, 32C, and 32K are independently detachably attachable to a main body of the printer from the image forming units 6Y, 6M, 6C, and 6K, respectively.

Figure 3:
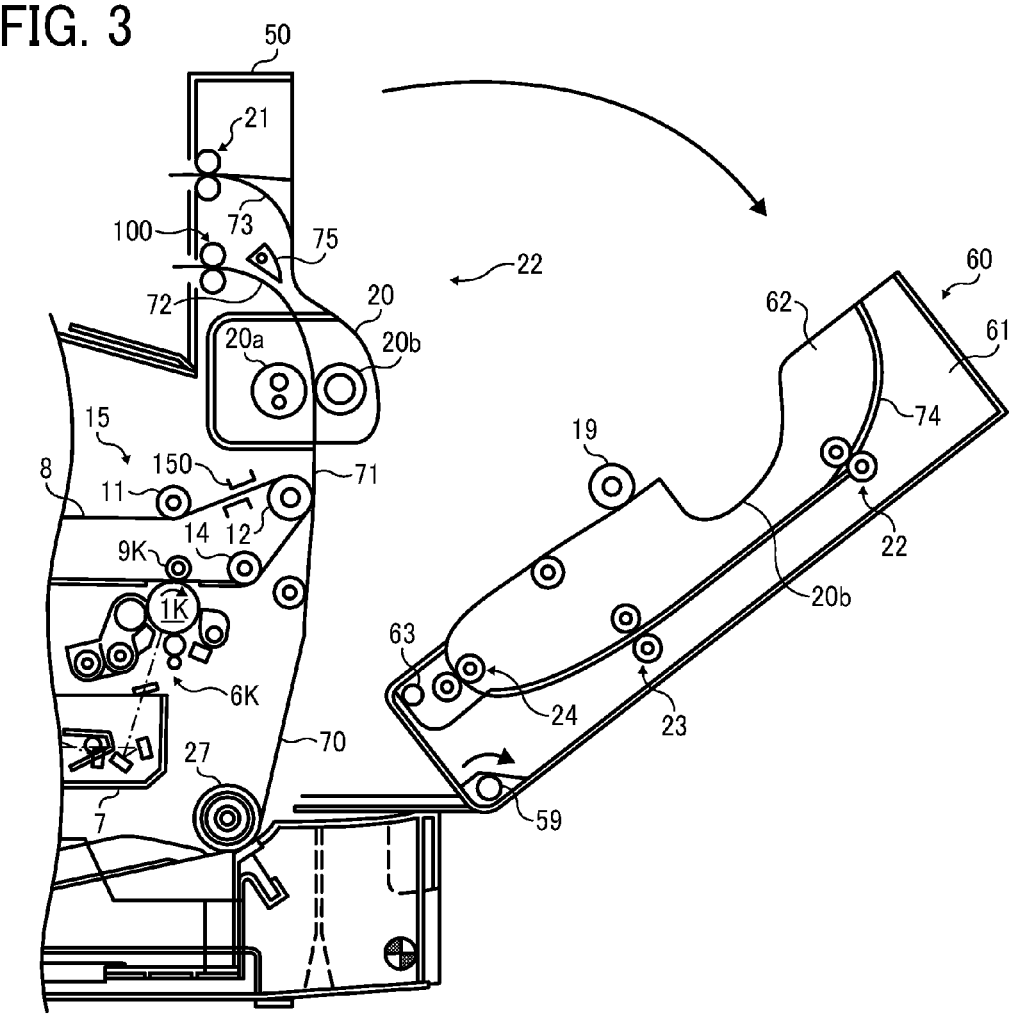
FIG. 3 is an enlarged view illustrating a door and a housing of the printer.

The reverse conveyance path 74 is formed inside the opening and closing door. The door has a rocking support unit 62 and an external cover 61. Specifically, the door of the external cover 61 is supported to swing around a first shaft 59 installed in a housing 50 of the printer main body. The external cover 61 closes and opens an opening, not shown, formed on the housing 50 when swinging. Further, the oscillating motion support 62 of the door is exposed outside as shown in FIG. 3 when the external cover 61 is opened. The rocking support unit 62 of the door is supported on the external cover to swing around a second swinging shaft 63 disposed in the external cover 61. With the swinging, the cover 61 is opened from the housing 50 and the rocking support unit 62 is enabled to swing regarding the external cover 61. Accordingly, the rocking support unit 62 and the external cover 61 separate from each other, so that the reverse conveyance path 74 is exposed. Hence, due to exposure of the inversion conveyance path 74, a jamming sheet on the reverse conveyance path 74 is easily removed.

Figure 4:
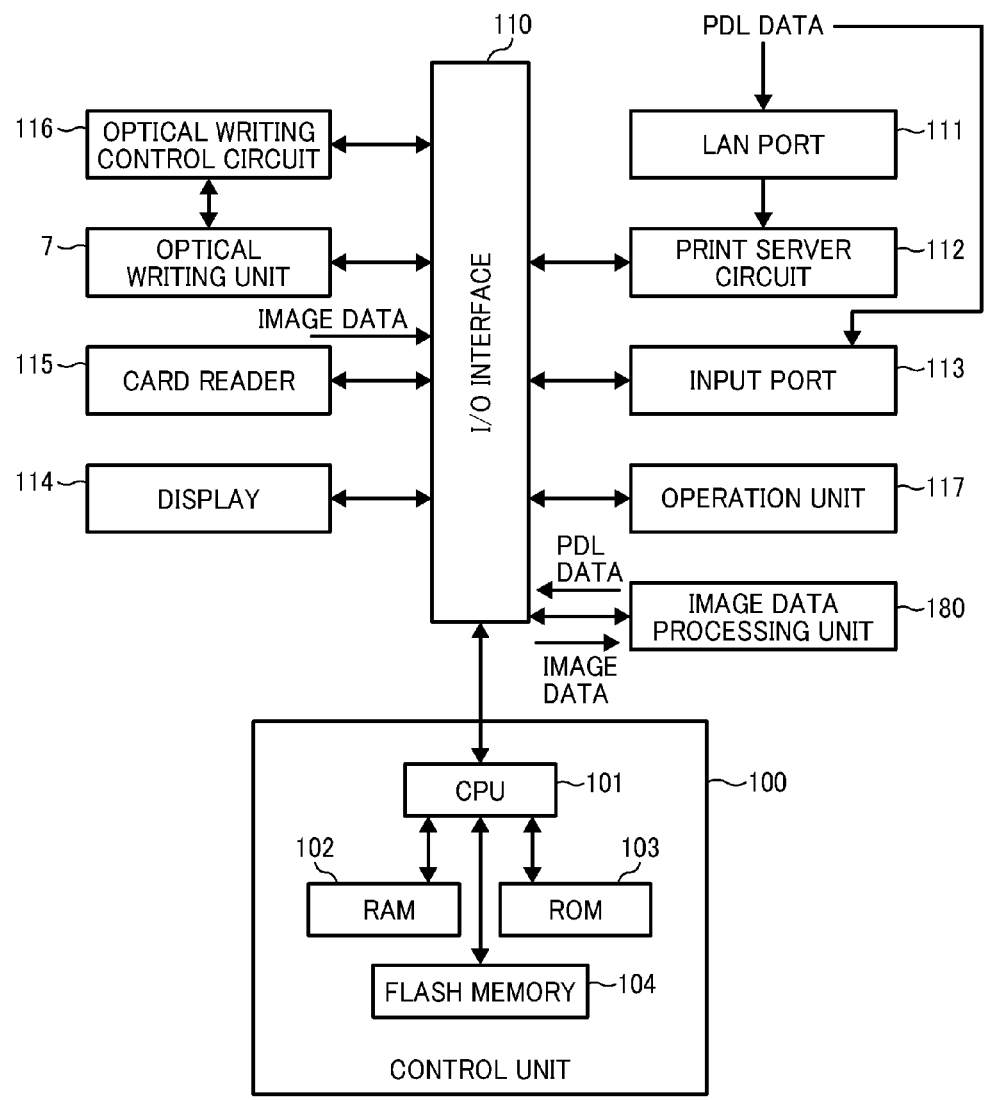
FIG. 4 is a block diagram partially illustrating an electrical circuit provided in the printer.

FIG. 4 is a block diagram partially illustrating an electrical circuit employed in the printer. As shown in the drawing, the control unit 100 has a flash memory 104 storing various data, a RAM 103 temporarily storing various data, a ROM 102 storing various data and control program, and a CPU 101. To the control unit 100, an optical writing unit 7, an optical writing control circuit 116, and a print server circuit 112 are connected through the I/O interface that executes signal communication with a peripheral machine. Also connected to the control unit 100 in this manner are an input port 113, a display 114, and a card reader 115. Further connected to the control unit 100 in this manner are an optical writing control circuit 116, an operation unit 117, and an image data processing device 180.

This printer forms an image based on PDL (page description language) data coming from a personal computer and a scanner externally disposed, basically. However, the printer builds PDL data by itself based on image data, such as JPEG, bitmap, JPM, etc. Specifically, the printer accepts PDL data sent from an external device at an input port 113 or a LAN port 111. The PDL data entered in the LAN port 111 is sent to the optical writing control circuit 116 and the control unit 100 through a print server circuit 112 and an I/O interface. The PDL data entered in the input port 113 is then sent to the control unit 100 via the I/O interface 110.

The optical writing control circuit 116 is a control device for driving the optical writing device 7. A card reader 115 reads electronic file data stored in a flash memory card, such as a micro SD card, an SD card, etc. Further, the display 114 mainly consists of an LCD and displays an image on a screen thereon. Further, the operation unit 117 mainly consists of a ten-pad key and various input buttons to accept key inputs from an operator.

Figure 5:
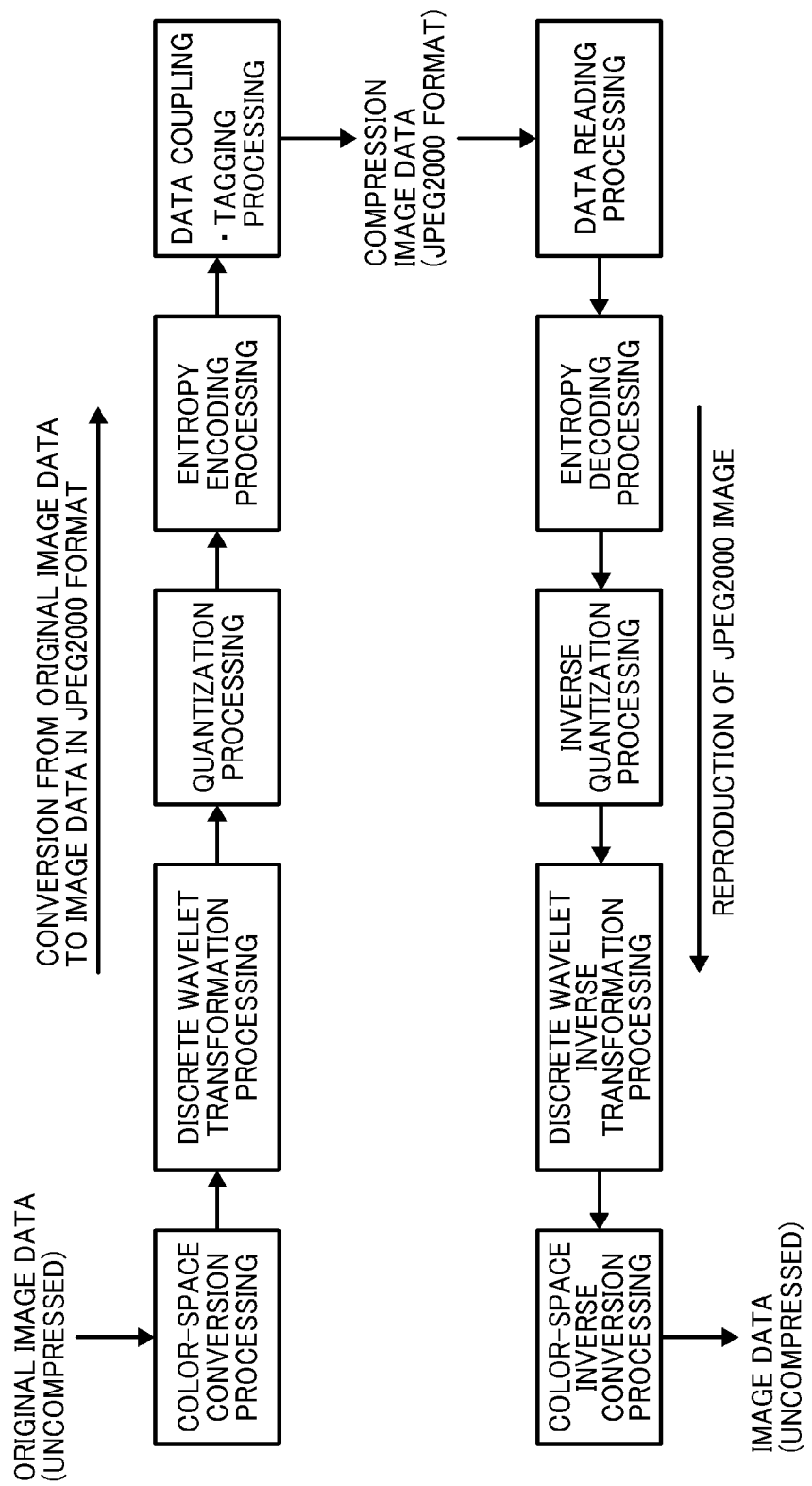
FIG. 5 is a Block diagram illustrating a sequence of converting uncompressed original image data to compressed image data in a JPEG 2000 format and a processing sequence of reproducing an image based on the compressed image data of the JPEG 2000 format.

Now, JPEG (Joint Photographic Experts Group) 2000 as compressed image data included in structured image data to be decoded by a printer according to one embodiment of the present invention is described. As shown in FIG. 5 of a block diagram, a sequence of converting uncompressed original image data into compressed image data in the JPEG 2000 format and a processing sequence of reproducing an image based on the compressed image data in the JPEG 2000 format are illustrated. Specifically, when converting uncompressed original image data to compressed image data in the JPEG 2000 format, color space processing, discrete wavelet transformation processing, quantization processing, entropy encoding processing, and data binding and tagging processing are sequentially applied to original image data as shown there. Whereas, when reproducing an image based on the compressed image data in the JPEG 2000 format, each of the above-described processes is applied to the compressed image data in an opposite order thereto. That is, uncompressed image data is obtained by sequentially applying the data reading process, the entropy decoding process, the inverse quantization process, the discrete wavelet inverse transformation process, and the color space inverse conversion process to the compressed image data.

Figure 6:
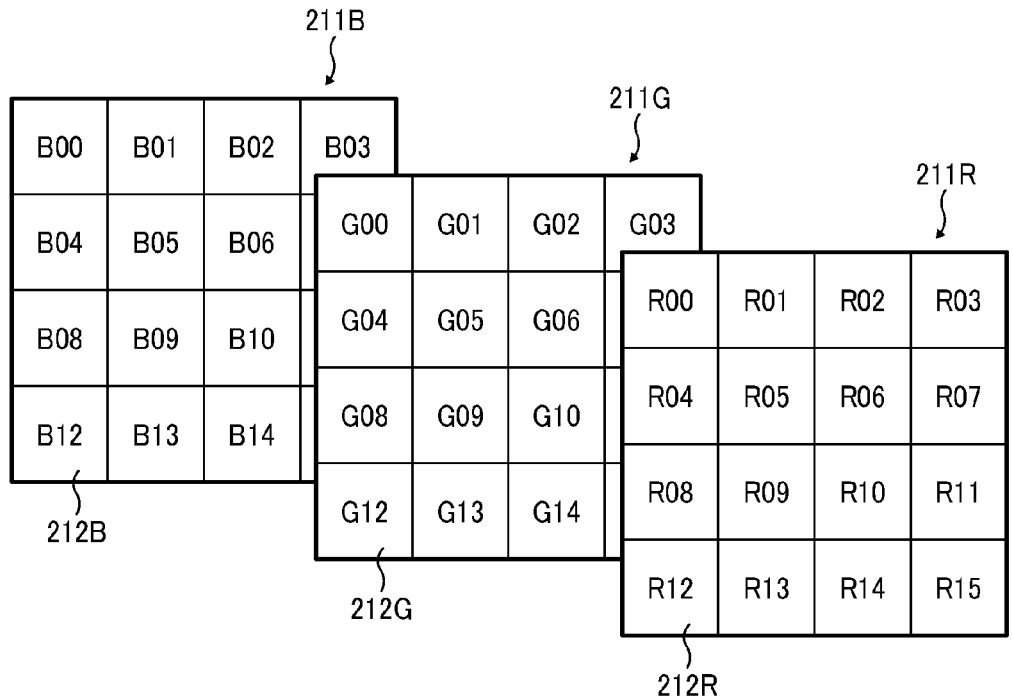
FIG. 6 is a schematic view illustrating three primary components of original image data.

In the original image data, each of original image data pieces R (red), G (green), and B (blue) as three primary components is divided into a prescribed numbers of rectangular areas as shown in FIG. 6. The number of division times is greater than one. The thus divided rectangular region is called a tile. As illustrated as one example, three primary components 211 R, 211G and 211B of RGB are vertically and laterally divided into multiple rectangular tiles 212R, 212G, and 212B (e.g. 4×4=16), respectively. When the component R is typically described, it is divided into sixteen tiles R00, R01, R02, R03, R04, R05, R06, R07, R08, R09, R10, R11, R12, R13, R14, and R15 as shown there. These tiles (212R, 212 G, 212 B) serve a basic unit when an image data compression process (encoding) and an image data decompression process (decoding) are performed. Therefore, the compression and decompression of the image data are performed per component and tile.

When the original image data is encoded, color space conversion processing is initially applied to data of each of tiles 212R, G, and B of the components 211R, G, B. Hence, an RGB color system consisting of three primary R, G, and B color components is converted into a YMC color system, a YUV color system, or a YCbCr color system and the like composed of components of complementary colors Y (yellow), M (magenta), and C (cyan). The image data converted in this way undergoes spatial partitioning into a prescribed frequency bands receiving discrete wavelet transformation processing. Such spatial partitioning is performed by a prescribed layer number of times upon need.

Figure 7:
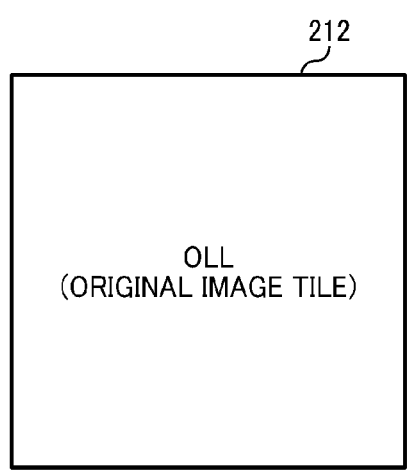
FIG. 7 is an enlarge schematic view illustrating a tile in the original image.
Figure 8:
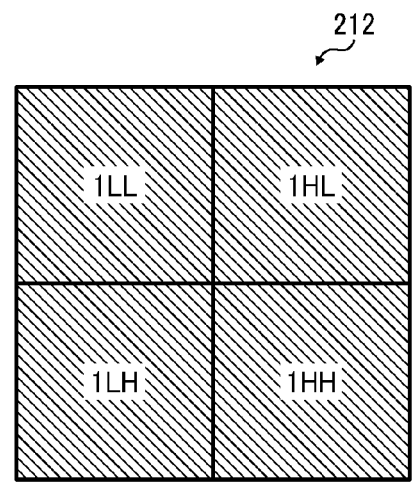
FIG. 8 is a schematic view illustrating image tiles when a discrete wavelet transformation process is applied up to a first layer.
Figure 9:
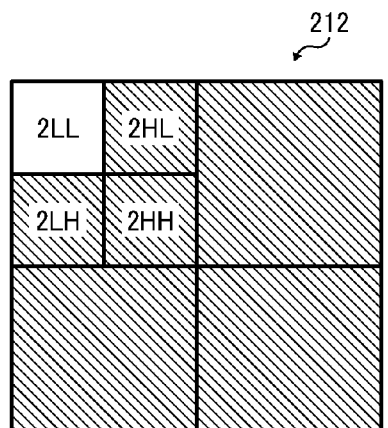
FIG. 9 is a schematic view illustrating image tiles when a discrete wavelet transformation process is applied up to a second layer.
Figure 10:
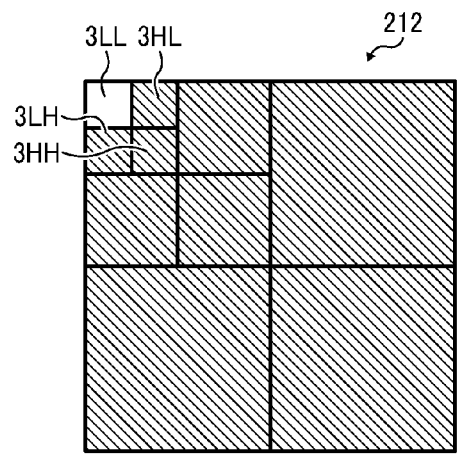
FIG. 10 is a schematic view illustrating image tiles when a discrete wavelet transformation process is applied up to a third layer.

FIG. 7 is an enlarged schematic view illustrating one of the original image tiles. When the Discrete wavelet transformation is applied to the data of the original image tile, the original image tile is divided into four sub-bands 1LL (first layer—vertical low frequency component—lateral low-frequency component), 1HL (first layer—vertical high-frequency component—lateral low-frequency component), 1LH (first layer—vertical low frequency component—lateral high frequency component), 1HH (first layer—vertical high-frequency components—lateral high-frequency component) as shown in FIG. 8. Specifically, a state with the thus divided four sub-bands represents the first layer (a layer number=1). When a space partition is executed up to a second layer, the discrete wavelet transformation is further applied to the sub-band 1LL among those of four sub-bands. Hence, as shown in FIG. 9, this 1LL is further split into four sub-bands 2LL, 2HL, 2LH, and 2HH. When a space partition is executed up to a third layer, the discrete wavelet transformation is further applied to the sub-band 2LL among those of four sub-bands. Hence, as shown in FIG. 10, the sub-band 2LL is further divided into four sub-bands 3LL, 3HL, 3LH, and 3HH. In FIGS. 8 to 10, the sub-bands as encoding targets in each of the hierarches are represented by hatching. For example, in the first layer, three sub-bands 1HL, 1LH, and 1HH are the encoding targets. Further, in the third layer, three sub-bands 3HL, 3LH, and 3HH are the encoding targets, but the sub-band 3LL is not encoded.

After the discrete wavelet transformation is executed by the number of times corresponding the layer numbers, the conversion result undergoes a quantization process. In the 77-quantization process, a bit to be encoded is specified in a designated order, and context is generated from a bit around the target bit.

Figure 11:
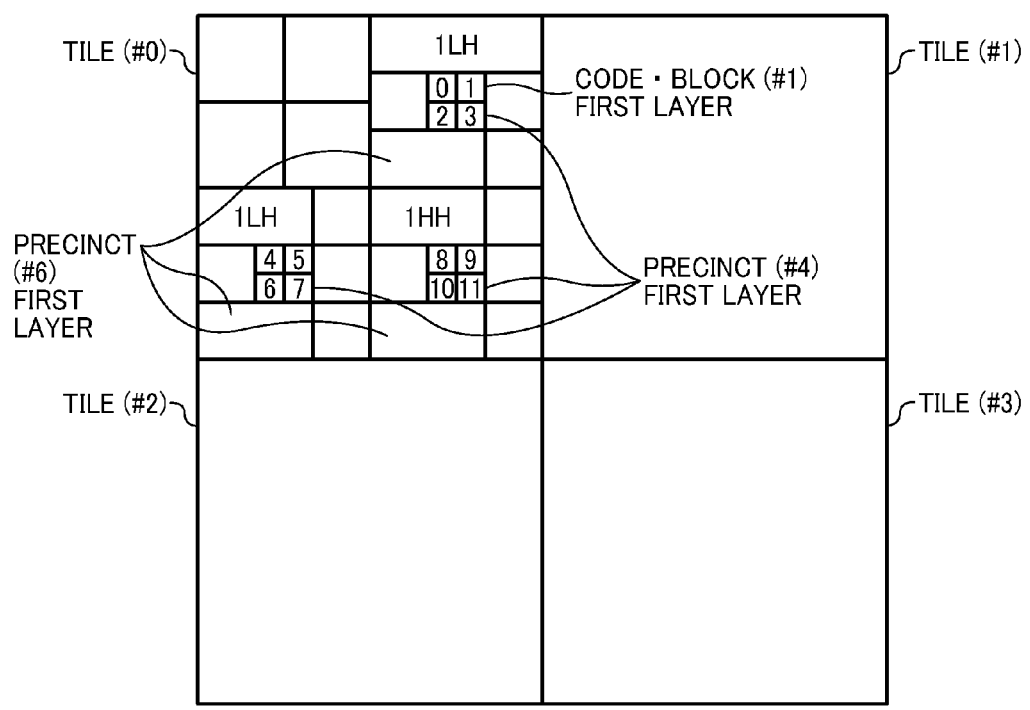
FIG. 11 is an enlarged schematic view illustrating the precinct.

A wavelet coefficient obtained by quantization processing is divided into rectangular shapes called precincts per sub-band not overlapping with each other to efficiently use a memory during implementation. FIG. 11 is a larger schematic view illustrating a precinct. As shown there, one precinct is formed from spatially matching three rectangular regions. More specifically, in rectangular sub-bands, a set of three regions located spatially at the same position of the sub-bands HL, LH, and HH on the same number layer is treated as a single precinct. However, in a sub-band LL, one region is treated as one precinct. Further, each of the precincts is divided into rectangular code blocks not overlapping with each other. The size of the precinct can be the same as the sub-band. The code block serves as a basic unit for entropy encoding. Hence, the below described size relation is established between an image, a tile, a sub-band, a precinct, and a code block. Image≥Tile>Sub-band≥Precinct≥Code-block.

Figure 12:
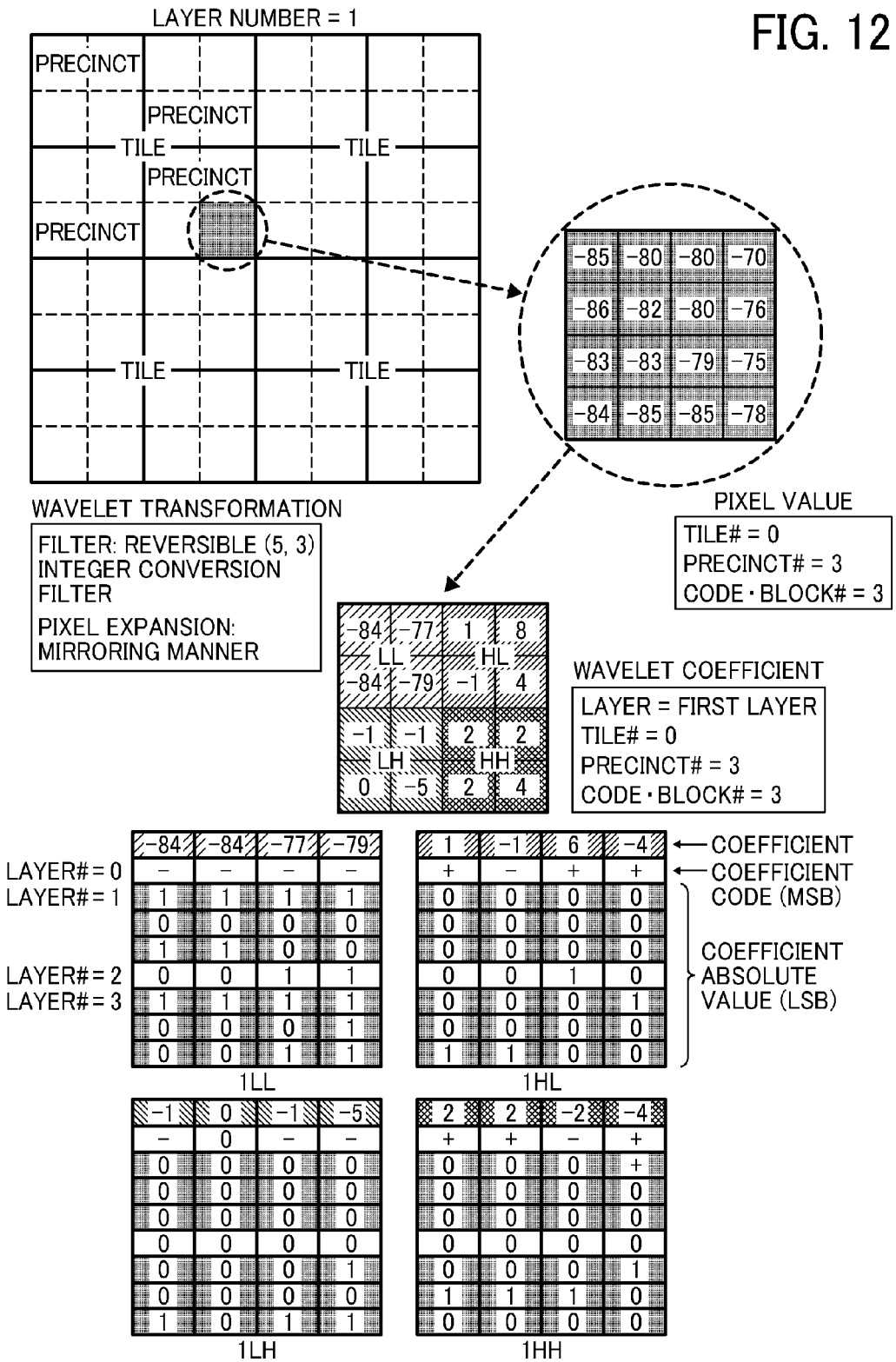
FIG. 12 is a schematic view illustrating a procedure of ranking bit planes as one example.

FIG. 12 is a schematic view illustrating steps of ranking bit-planes as one example. As shown there, the original image (32×32 pixels) is divided into four tiles of 16×16 pixels as one example. A size of a precinct of a first layer is 8×8 pixels. A size of the code block is 4×4 pixels. Numbers of the code blocks and the precincts are assigned in a raster order. In this example, the precincts are assigned the numbers from 0 to 3, and the code blocks are assigned the numbers in the same manner. For pixel extension outside a tile boundary, a minoring method is used and wavelet transformation is applied using a reversible (5, 3) filter, so that a wavelet coefficient value for a first layer is sought. The converted code block is divided into sub-bands (1LL, 1HL, 1LH, 1HH). The wavelet coefficient value is then assigned to each of the sub-bands.

The layer structure is easy to understand when the wavelet coefficient value is viewed in a lateral direction (i.e., a bit-plane direction). Here, one layer is mainly composed of any number of bit planes. In this example, layers 0, 1, 2, and 3 mainly consist of bit-plains 1, 3, 1, and 3. As it contains a bit-plane closer to an LSB (Least Significant Bit), a layer is immediately subjected to quantization. Conversely, as it contains the bit-plane closer to a MSB (Most Significant Bit), a layer remains not being quantized until the end. A manner of start disposing from the closer layer to the LSB is called truncation and is capable of closely controlling a quantum rate.

In an entropy encoding process, tiles of each component are encoded using a probability estimation based on a subject bit and a context. Thus, the encoding process is executed per tile for all components of the original image.

In the data merging and tagging processing, all code data obtained in the entropy encoding process is merged into a single code series data, and a tagging process is executed. Specifically, the code series data (a code stream) is generated by disposing unwanted entropy encode, generating a packet by compiling required entropy codes, and arranging the packets in a prescribed order while adding a necessary tag and tag information thereto. Specifically, the packet is created by partially extracting codes (e.g. three sheets of bit-planes from the top to a third bit) of every code blocks contained in the precinct. Here, a packet with an empty code is permissible. A "bit stream" is generated by arranging packets in a given order while compiling the codes of the code blocks.

Figure 13:
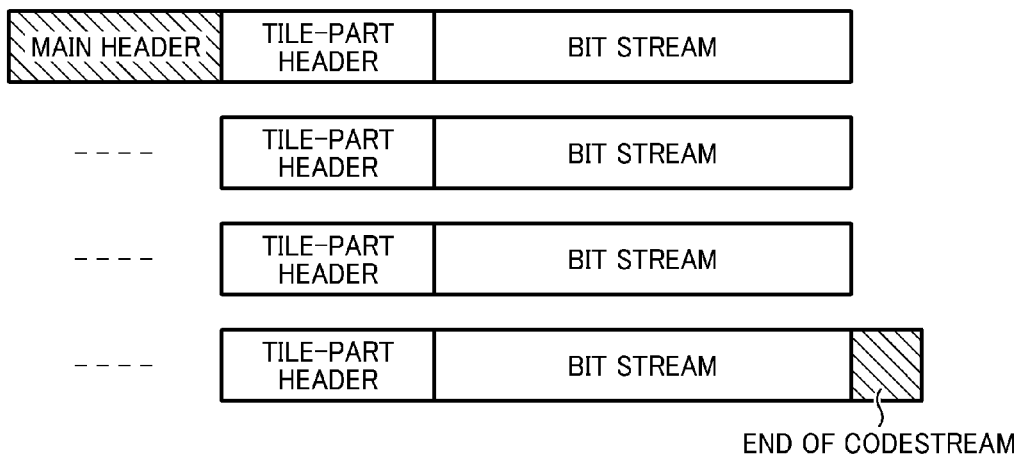
FIG. 13 is a schematic view illustrating a configuration of one frame of code series data.

FIG. 13 is a schematic view illustrating a configuration of one frame of code series data. As shown, tag information called a header (e.g. a main header, a tile-part header as tile boundary position information) is attached to each of leading ends of the code series data and code data (bit stream) of the tile. Specifically, each tile code data follows thereafter. In the main header, an encode parameter and a quantization parameter are described. A tag (e.g. End of code stream) is placed again at the end of the code series data.

Meanwhile, when the encoded data is decoded, image data is generated based on the code series data of each tile of each component on the contrary to when image data is encoded. Specifically, a data reading process interprets the tag information appended to the code series data inputted from an external device and decomposes the code series data into code series data for each tile of each of components. Then, a decoding process (e.g. decompression processing) is executed per code series data of each tile 112 of each of components. At that moment, a position of a target bit to be decoded is determined in an order specified by the tag information included in the code series data, and a context is then generated base on an arrangement of peripheral bits (already decoded) of the target bit. By estimating a probability based on the context and the code series data and decoding, a target bit is generated and is written at a position thereof. Since the thus decoded data has undergone the space partitioning per frequency band, when the discrete wavelet inverse transformation process is applied to the decoded data, each tile of each of components of the image data is restored. The thus restored data is converted into image data of the original color system by applying the inverse color space inverse conversion process.

Figure 14:
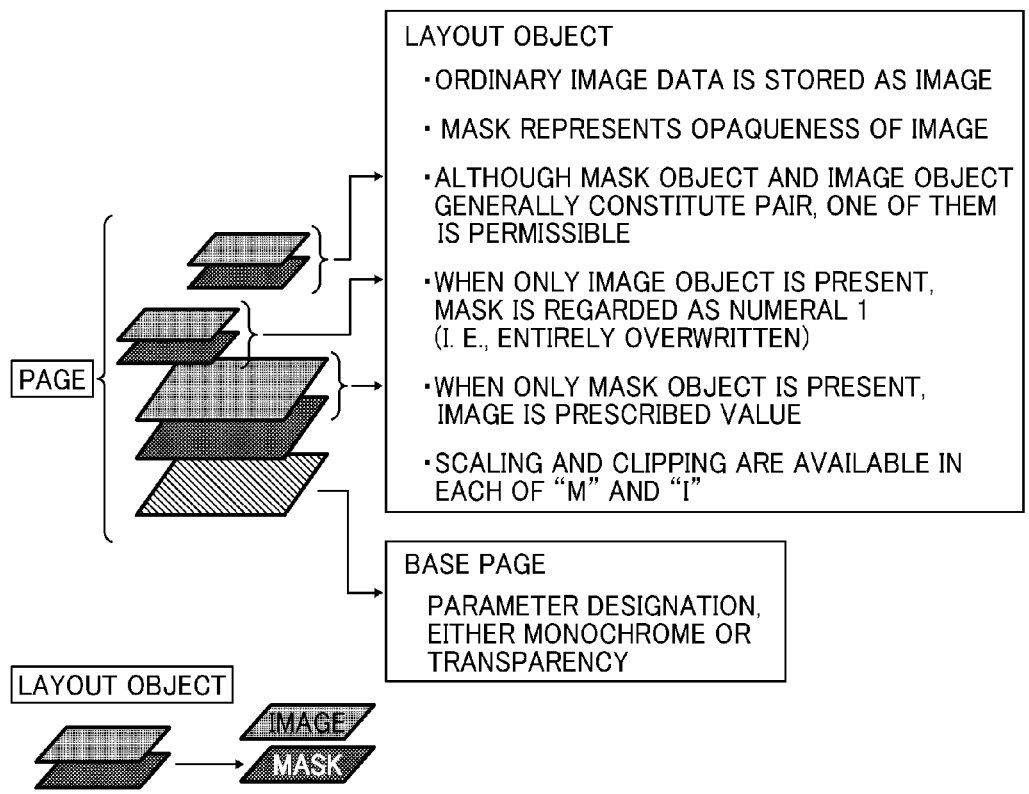
FIG. 14 is a schematic view illustrating an outline of JPM.

Now, a JPM as structured data decoded by a printer according to one embodiment is described. FIG. 14 is a schematic view illustrating an outline of the JPM. In the drawing, "Page" is composed of "Layout Object" and "Base Page". A parameter, such as monochrome, transparent, etc., is designated to the "Base Page". The "Layout Object" is composed of "Image" and "Mask". Ordinary image data is stored in the "Image". The "Mask" represents opacity of the "Image". Usually, the "Mask Object" and the "Image Object" are used as a pair. However, only one of them can be used. Specifically, if only the "Image Object" is used, the "Mask" is treated as being "1" (e.g. entirely overwritten). If only the Mask Object is used, a prescribed value is designated to the "Image". Both of scaling and partial cutting (i.e., clipping) are available for Mask and Image.

Figure 15:
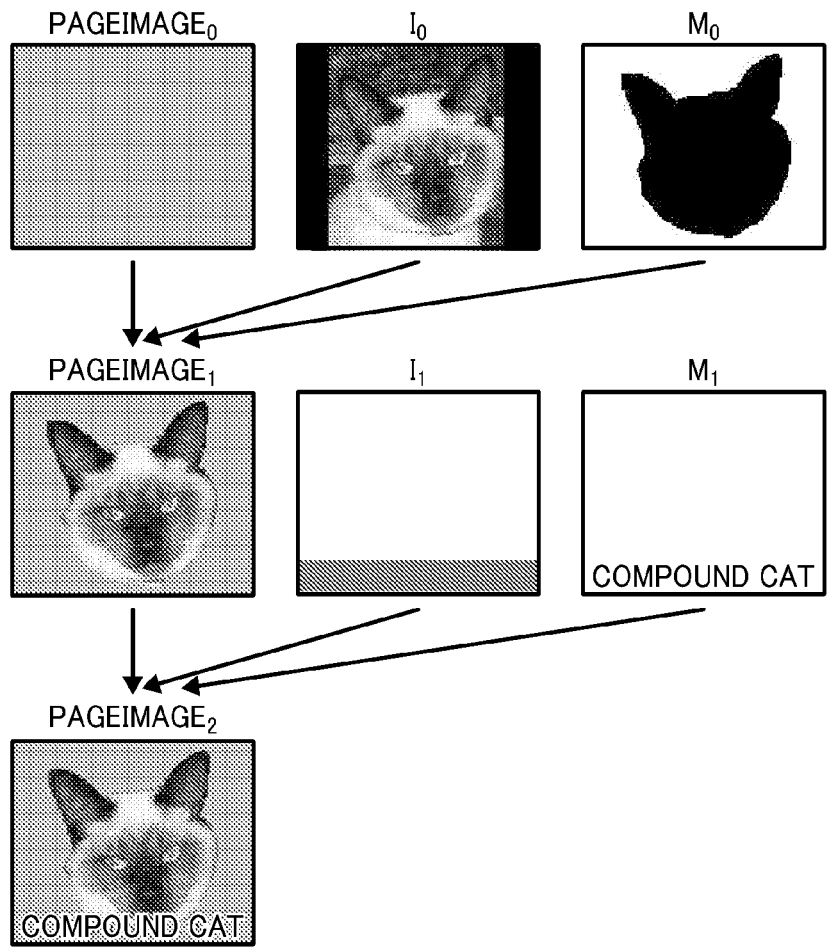
FIG. 15 is a schematic view illustrating an image expressed by JPM as one example.

FIG. 15 is a schematic view illustrating an image expressed by JPM as one example. Specifically, a Base Page included in the JPM is treated as Page Image "0" (e.g. background "0"). On the Page Image "0" of the Base Page, a section of Mask 0 (mask 0) in the Image 0 (i.e., foreground 0) of a first Layout Object is stacked, so that Page Image 1 (i.e., background 1) is synthesized. At the same time, a black pixel position in the Mask 0, opacity is treated as being "1", and the Image 0 is overwritten on the Page Image 0. At a white pixel position of the Mask 0, transparency is treated as being "1", and the Page Image 0 is displayed. Similarly, a Page Image 2 (background 2) is obtained by synthesizing the Page Image 1 (background 1) and Image 1 (foreground 1) of a second Layout Object, and Mask 1 (mask 1). At the same time, at a black pixel position of the Mask 1, the Image 1 is overwritten on the Page Image 1, and Page Image 1 is displayed at a white pixel position of the Mask 1. In this example, the Page Image2 serves as a reproduced image of "Page Image" to be finally displayed.

The below described first formula represents one example of an arithmetic expression calculated when an image is reproduced based on the JPM. First Formula: Page Image0 [C] [x, y]=Base Image [C][x,y]. Page Image$_m$ [C] [x, y]= (Sm-Mm [x,y]×Page Image$_{m-1}$ [C] [x, y]+Mm [x,y]×Im [C] [x,y])/Sm. Page Image [C] [x, y]=Base Image$_n$ [C] [x, y].

In the arithmetic expression of the first formula, Page Image1 is generated based on Page Image 0, Image 0, and Mask 0. When the Mask 0 is black, opacity is treated as "1" and the Image 0 is overwritten. Whereas, when the Mask 0 is white, transparency is treated as "1" and the Page Image 0 is displayed. Similarly, a Page Image 2 is generated based on the Page Image 1, the Image 1, and the Mask 1. When the Mask 1 is black, transparency is treated as "1" and the Image 1 is overwritten. Further, when the Mask 1 is white, transparency is treated as "1" and the Page Image 1 is displayed.

The second line from the top in the arithmetic expression of the first formula is an expression that represents a blending (e.g. image reproduction) manner. The symbol Mm represents a pixel value of a Mask Object in an "m" order number Layout Object. The symbol Im represents a pixel value of an Image Object in the "m" order number Layout Object. Further, "C" represents a component. The Mask Object represents a single component. The symbols x and y represent coordinates of an image. Further, the symbol Sm represents the maximum value (e.g. exponentiation of 2−1) of the Mm (mask). Further, "n" represents the number of Layout Objects contained in a page.

Figure 16:
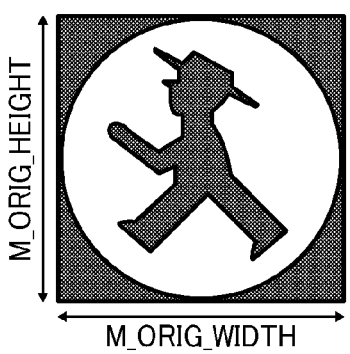
FIG. 16 is a schematic view illustrating a decoded mask as one example.
Figure 17:
FIG. 17 is a schematic view that demonstrates a mask when its magnification is changed both vertically and horizontally.
Figure 18:
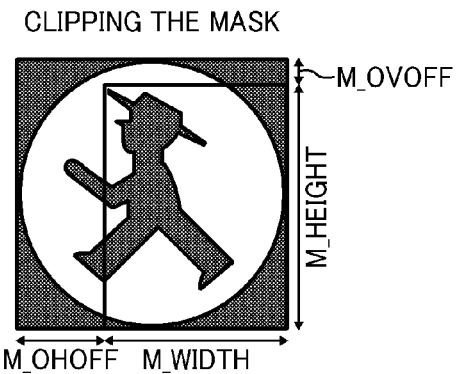
FIG. 18 is a schematic view illustrating partial clipping of the mask.
Figure 19:
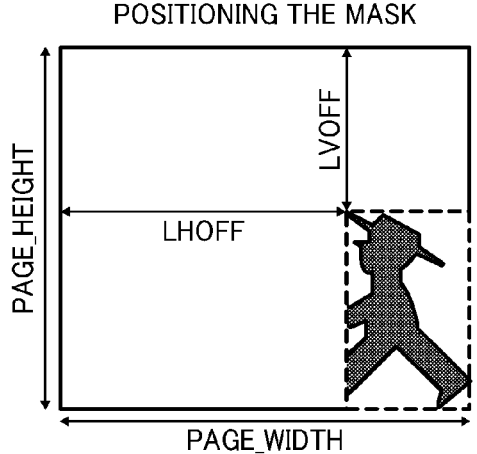
FIG. 19 is a schematic view illustrating a process of positioning the clipped mask portion.
Figure 20:
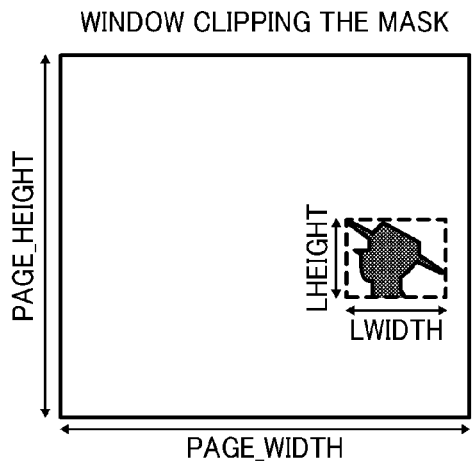
FIG. 20 is a schematic view illustrating a magnification of the mask executed after the positioning.

FIG. 16 is a schematic view illustrating a decoded mask as one example. The decoded mask can be independently magnified both vertically and horizontally as shown in FIG. 17. Further, only a part of the mask can be cut out (i.e., clipped) and used as shown in FIG. 18. A position to lay out the thus clipped mask on the page can also be optionally designated as shown in FIG. 19. Further, after laying it out at a specified position on the page, the clipping can be executed as shown in FIG. 20.

Now, one example of a unique configuration of the printer is described. The printer reads JPEG image data, bitmap image data, JPM image data recorded in a Flash memory card, such as an SD card, etc., with a card reader 115 (see FIG. 4), and displays an image on a display 114 and/or forms an image based on these data pieces. In other words, the printer can build PDL data and form an image thereof by itself based on image data of a prescribed format even if PDL data is not provided from an external device.

The Control unit 100 extracts only an image data file having a specific extension, such as "JPG", etc., among electronic files recorded in the flash memory card by recognizing that the flash memory card is plugged in to the card reader 115. The control unit 100 then builds a list of file names and displays the list on the display 114. A touch panel is adopted as the screen 114, and when an operator touches a portion thereof indicating a desired filename among the listed filenames, the control unit 100 reads an image data file corresponding to the file name. At that moment, when the image data file includes compressed image data, such as Jpeg 2000, JPM, etc., the thus read image data is sent to the image data processing device 180. The image data processing device 180 then decodes the encoded image data received based on a previously stored algorithm or the like and sends it back to the control unit 100.

Figure 22:
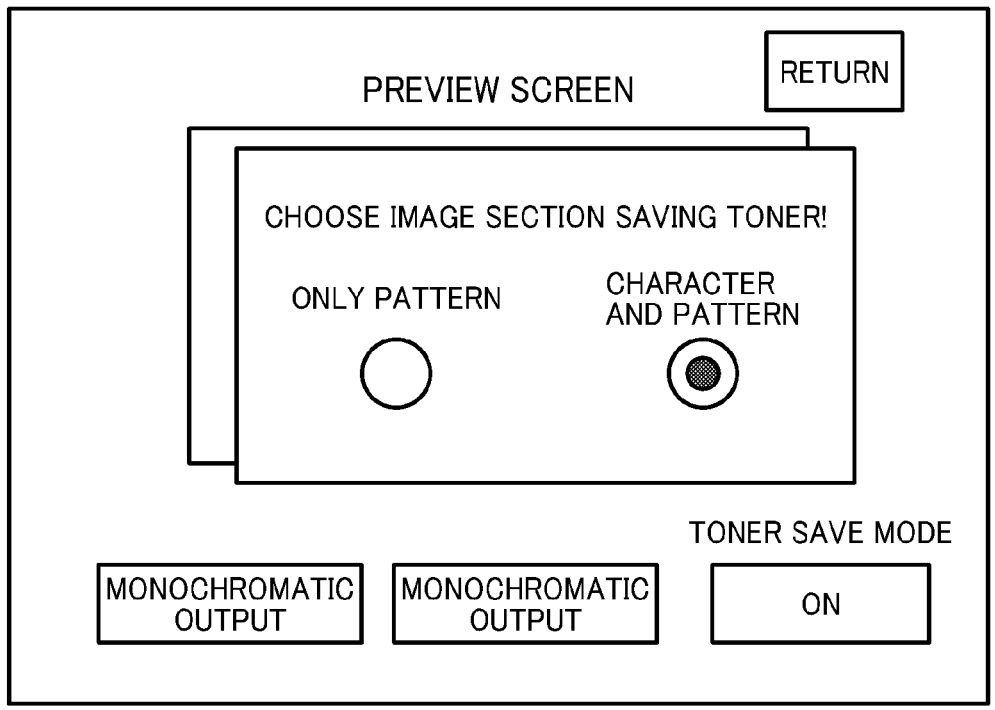
FIG. 22 is a schematic view illustrating a Sub-screen displayed on the display of the printer as one example.

When an operator touches a display section on a preview screen indicating messages "monochromatic outputting" or "color outputting", the control unit 100 confirms a setting condition for a toner save mode. Here, the toner save mode is a mode for reducing consumption of coloring toner by printing with a lighter shade than printing the original image as is. In the illustrated example, the toner save mode is set to be "ON". In this situation, when the operator touches the display section displaying "ON", the toner save mode is set to be OFF, and the display "ON" is switched to that of "OFF". By contrast, when the operator touches a display section displaying "OFF", the toner save mode is set to be ON, and the display OFF is switched to that of "ON". When the toner save mode is set to be ON, the display section indicating "monochromatic outputting" or "color outputting" is touched, and the image data is JPM format data, the control unit 100 displays a prescribed sub-screen on the display 114 as shown in FIG. 22. The sub-screen is used by the operator when he or she chooses a region among the overall area of an image to reduce consumption of toner for it by lightening the shade thereof. If only "picture pattern" is selected by the operator, only a background image undergoes the shade lightening process. Whereas when "character and picture pattern" is selected by the operator, both background and foreground undergo the shade lightening processes.

Figure 21:
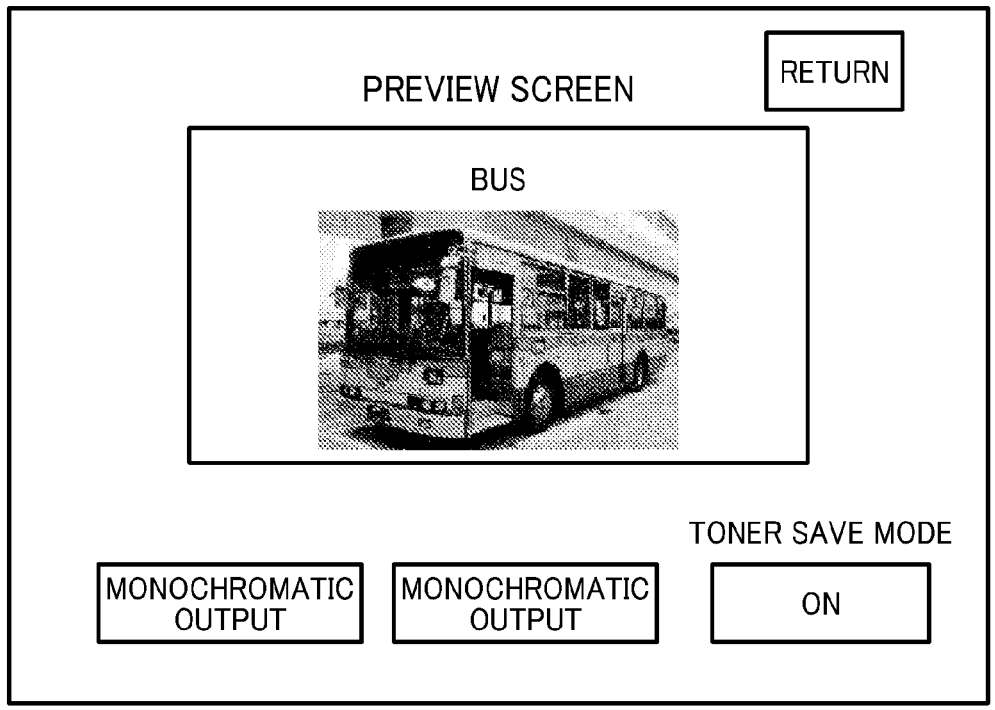
FIG. 21 is a schematic view illustrating a preview screen that appears on a display of the printer as one example.
Figure 23:
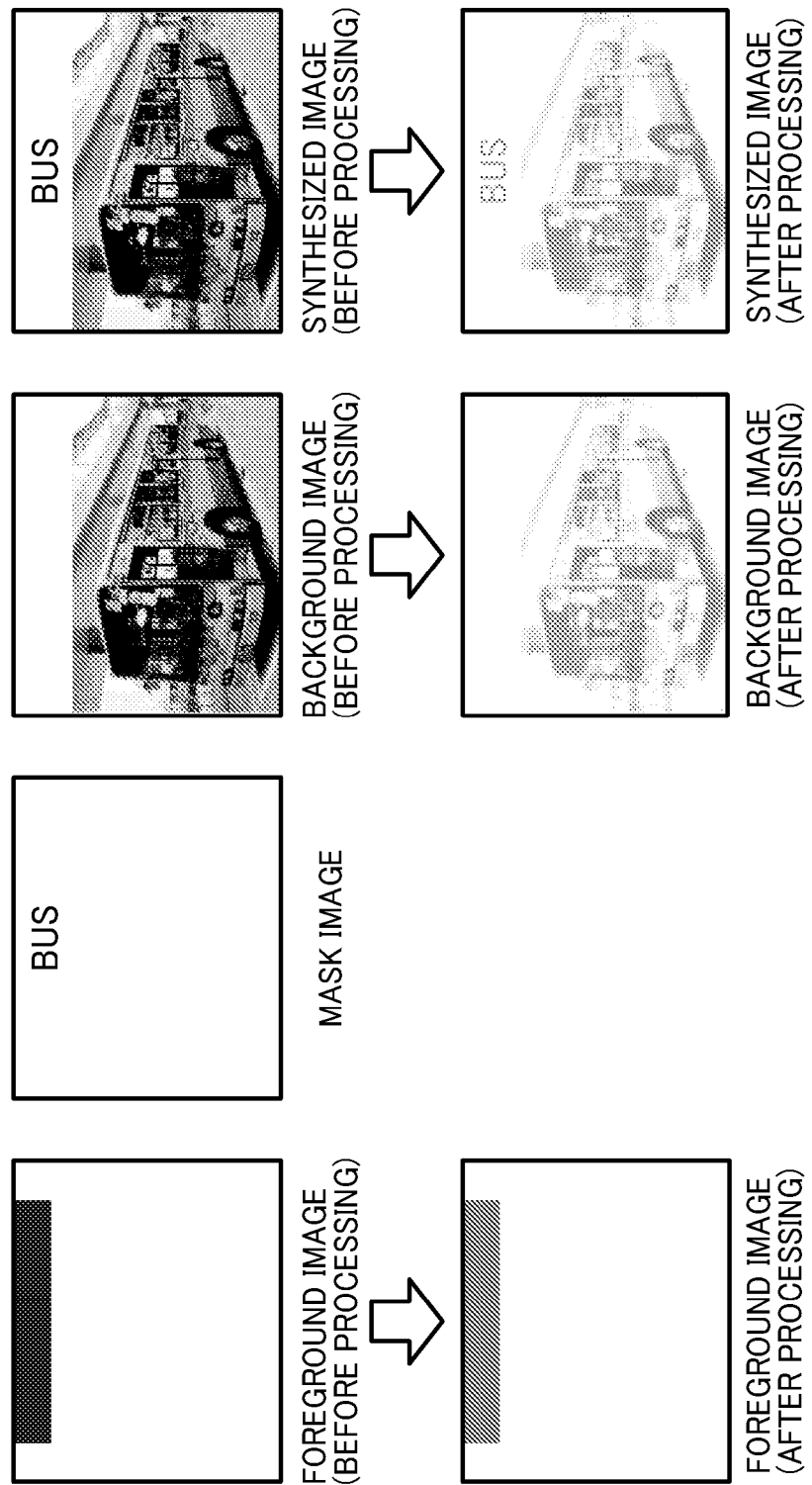
FIG. 23 is a schematic view illustrating a color lightening process applied to foreground and background images.

When JPM image data for displaying an image of a bus as shown in FIG. 21 is typically described, the JPM image data includes foreground data compressed in the JPEG 2000 format to reproduce a belt like foreground image, bask data to express a character line of "bus", and background data compressed in the JPEG 2000 format to reproduce a photographic image of the bus as a background image as shown in FIG. 23. When an indication of "character and design" is selected and touched on the sub screen by the operator as described above, the image data processing device 180 applies a background color lightening process to the background data for lightening a shade of the photographic image of the bus. The image data processing device 180 also applies foreground lightening processing to the foreground data to lighten a foreground image by a degree less than that applied to lighten the background image. By lightening the shade of the belt like foreground image by a degree less than that applied to lighten the background image formed from photographic image of the bus, consumption of toner can be reduced both at the foreground and background images while making the foreground image more prominent than the background image. Hence, consumption of toner can be effectively reduced even when a foreground image with a relatively high area ratio is printed.

Further, when the indication of "only picture pattern" is selected and touched by the operator on the sub screen as described above, only the background lightening processing is applied to the background data as executed by the image data processing device described in JP-2007-235679-A. Specifically, the foreground lightening processing is not applied to the foreground data, and the foreground with an original shade is overlaid as is on the background image having been subjected to the shade lightening process.

Now, other embodiments of a printer having a more sophisticated configuration than that described heretofore are described, wherein a configuration of each of the printers is substantially the same as otherwise.

Figure 24:
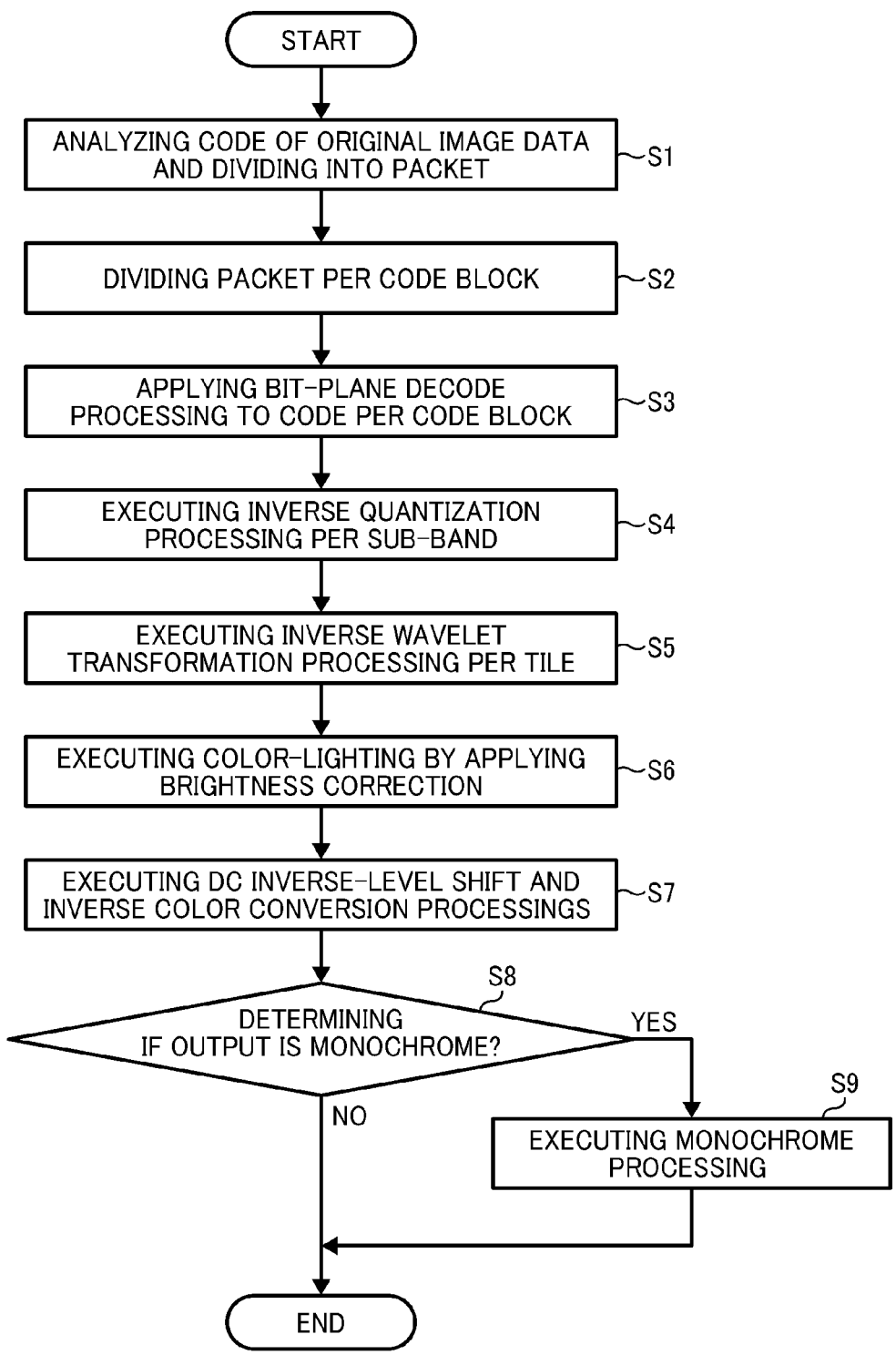
FIG. 24 is a flowchart illustrating a sequence of various processes applied to the foreground and background data pieces of JPM image data by an image data processing device provided in a printer according to a first embodiment.

Now, a first embodiment is described with reference to applicable drawings. FIG. 24 is a flowchart illustrating various processes applied to the foreground and background data of JPM image data by an image data processing device 180 of a printer according to the first embodiment. As shown there, the image data processing device 180 initially parses codes of foreground and background data pieces of original image data, and at the same time divides the foreground and background data (per) packet (in step S1). Subsequently, the image data processing device 180 further divides each of the thus obtained multiple packets into a unit of code block (in step S2). The image data processing device 180 then decodes encoded data per code block (S3), and then applies inverse quantization to the thus obtained decoded data per sub-band (S4). Here, when a real number type 9/7 irreversible filter is used as a wavelet filter, inverse normalization is also applied. The image data processing device 180 then applies inverse wavelet transformation processing to each of tiles of data thus obtained (S5), and applies color lightening processing to each pixel data in a pixel matrix thus obtained executing brightness correction (S6). The image data processing device 180 then applies inverse color conversion and DC inverse level shifting to each pixel data having undergone the color lightening processing (S7). When a monochromatic output is chosen (Yes in step S8), the image data processing device 180 finally executes monochrome processing (S9).

When decoding is executed to display the preview screen as described above, image data obtained in step S7 is sent to the control unit 100 omitting the process of the step S6.

Figure 25:
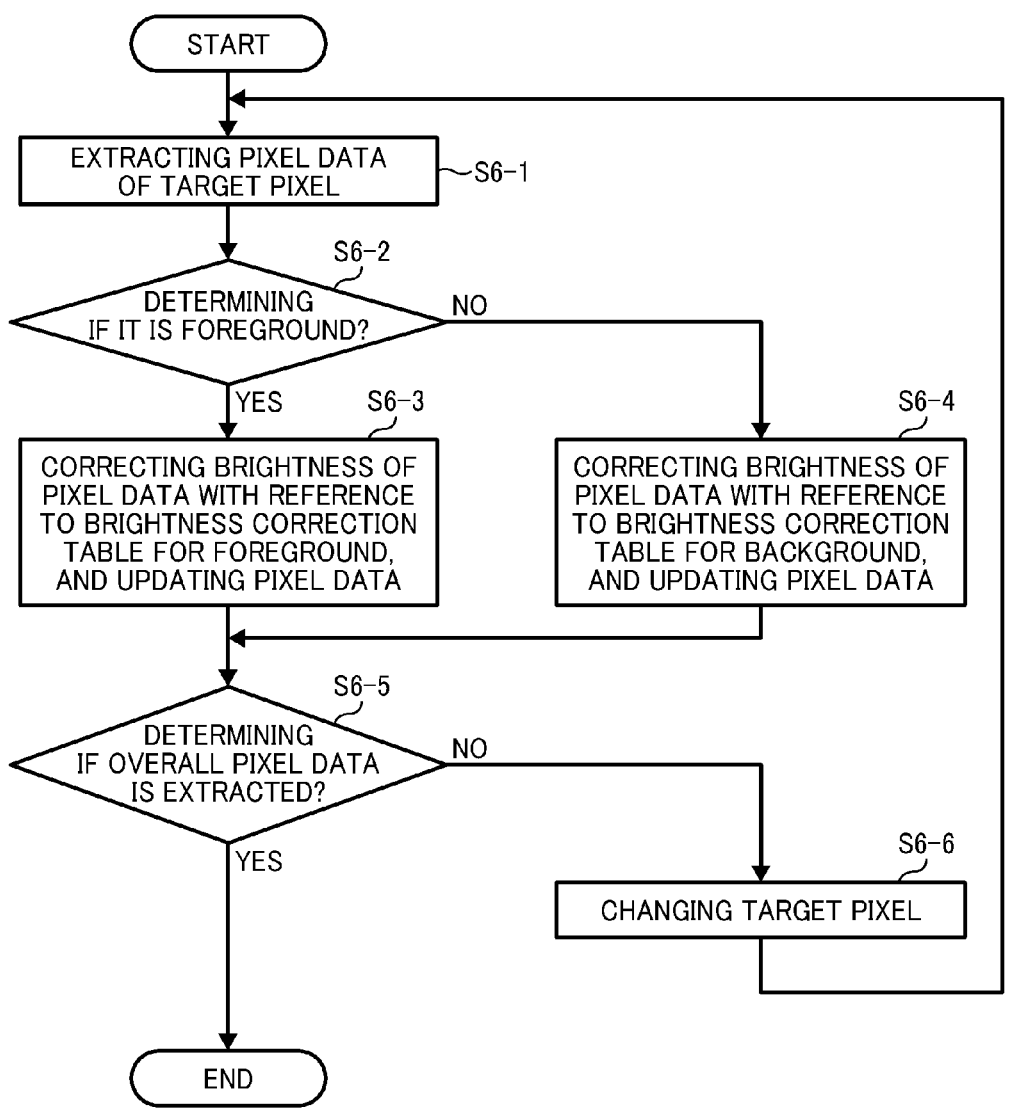
FIG. 25 is a flowchart illustrating a more detailed color lightening process executed in the printer using brightness correction.

FIG. 25 is a flowchart illustrating the color lightening process executing the brightness correction in more detail. In the color lightening processing, data of a target pixel is initially extracted among multiple pixels in the pixel matrix (S6-1). When the pixel data is foreground data (Yes in S6-2), a brightness of the pixel data is corrected based on a brightness correction table for a foreground stored in a data storage circuit, and the pixel data is updated (S6-3). Whereas, when the pixel data is background data (No in S6-2), the image data processing device 180 corrects the brightness of the pixel data based on the brightness correction table for the background stored in the data storage circuit, and updates the pixel data (S6-4). The image data processing device 180 then determines whether or not all of the pixel data has been extracted from the pixel matrix, (S6-5), and when not extracted pixel data remains (No in S6-5), the image data processing device 180 loops the control sequence with the step S6-1 after shifting the target pixel (S6-6).

Figure 26:
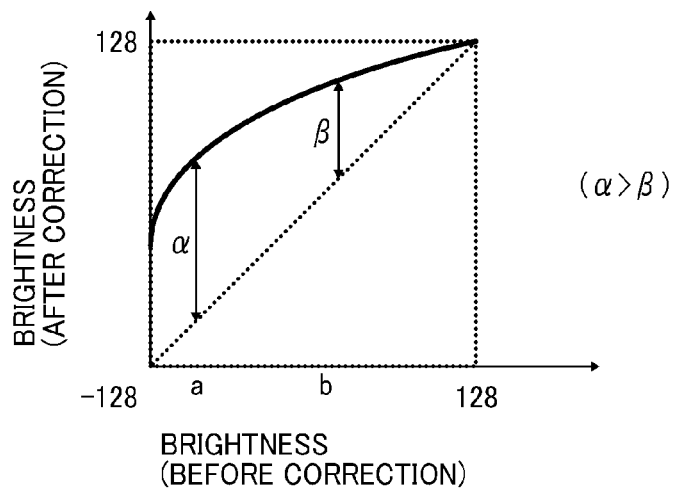
FIG. 26 is a chart illustrating a relation between a brightness before correction and that after correction stored in a brightness correction table for a background used in the printer.

FIG. 26 is a graph that shows a relation between brightness in a brightness correction table for a background before and after correction. As shown, in the background brightness correction, a brightness value is corrected under a rule such that as an original brightness is great on the positive side a growth rate of the increased brightness decreases. Further, a growth rate α of the brightness "a" is greater than the growth rate β of the brightness "b" greater than the brightness "a" on the positive side.

Figure 27:
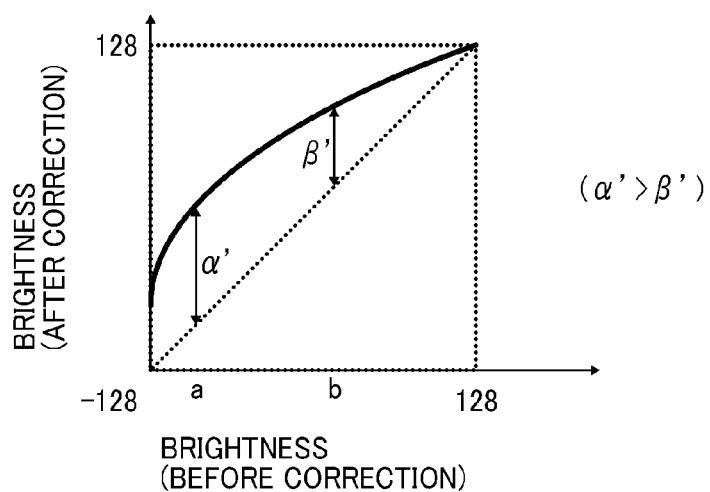
FIG. 27 is a graph illustrating a relation between a brightness before correction and that after correction stored in a brightness correction table for a foreground used in the printer.
Figure 28:
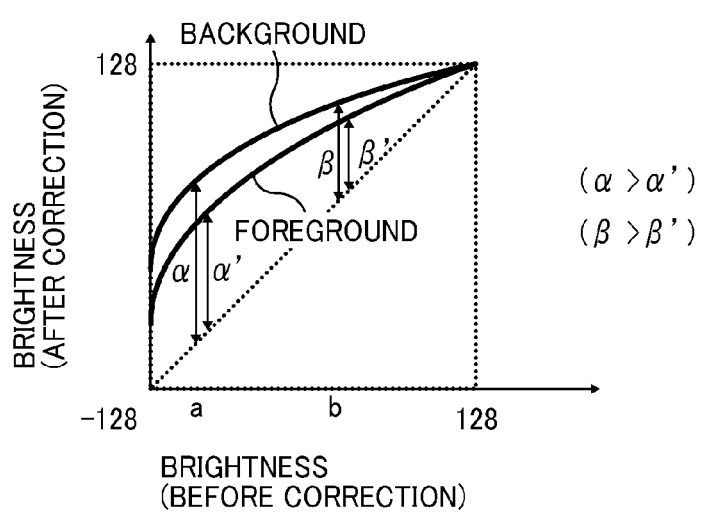
FIG. 28 is a graph obtained by superposing a graph of FIG. 26 on that of FIG. 27.

FIG. 27 is a graph that shows a relation between brightness in the brightness correction table for a foreground before and after correction. As shown, also in the foreground brightness correction, a brightness is corrected under a rule such that as an original brightness is great on the positive side a growth rate of the increased brightness decreases. Further, a growth rate α' of the brightness "a" is greater than the growth rate β' of the brightness "b" greater than the brightness "a" on the positive side.

Figure 29:
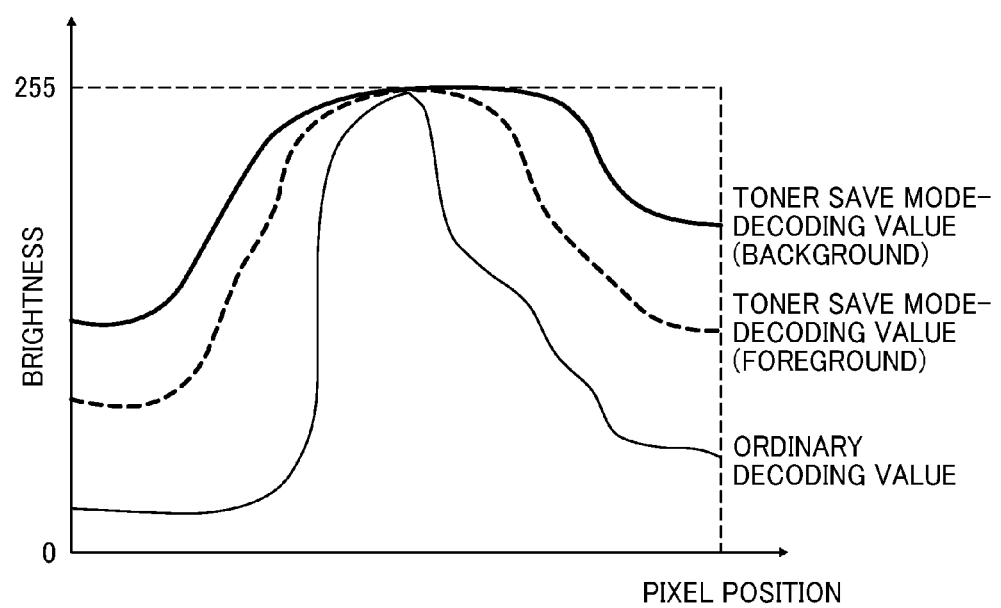
FIG. 29 is a graph illustrating a size relation between an original brightness and foreground and background brightness of each of pixels in the printer.

As shown, at the same brightness (e.g. a), a growth rate (for example, α) in the background is greater than a growth rate (e.g. α') in the foreground. Specifically, the below described inequality is established. Original brightness<foreground brightness<background brightness. By using the brightness-correction table, the foreground data can be processed such that a hue of the foreground image is lightened by a degree less than that for the background image. Hence, the below described relation can be established in every pixel as shown in FIG. 29 for example. Original brightness<foreground brightness<background brightness.

Figure 30:
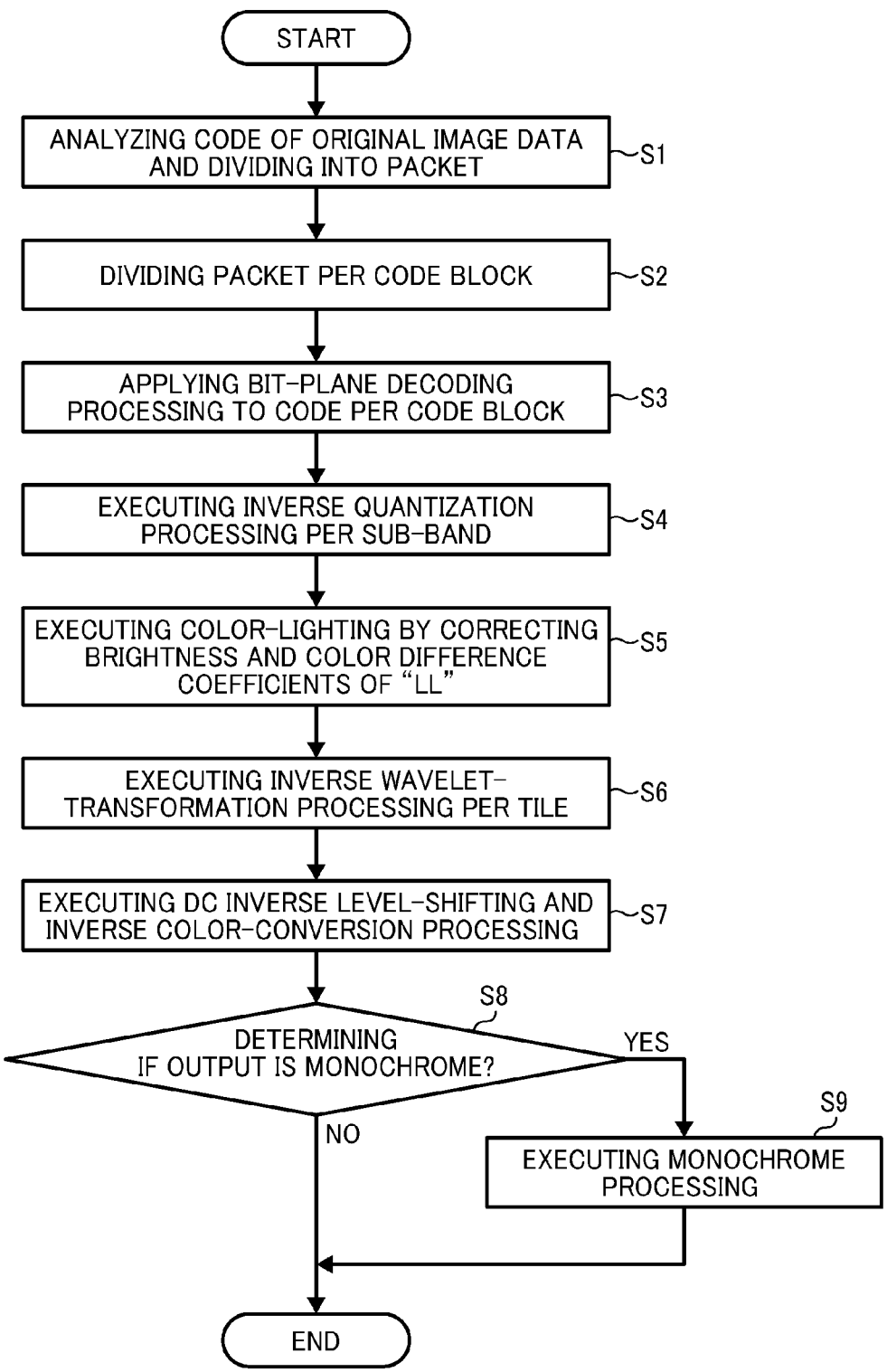
FIG. 30 is a flowchart illustrating a sequence of various processes applied to the foreground and background data pieces of JPM image data by an image data processing device provided in a printer according to a second embodiment.

FIG. 30 is a flowchart illustrating various processing applied to foreground and background data of JPM image data by an image data processing device 180 of a printer according to a second embodiment. As shown in the flowchart, the image data processing device 180 initially parses codes of foreground and background data pieces of original image data, and at the same time divides the foreground and background data (per) packet (in step S1). The image data processing device 180 then further divides each of the thus obtained multiple packets into a unit of code block (in step S2). The image data processing device 180 then decodes encoded data per code block (S3), and then applies inverse quantization to the thus obtained decoded data per sub-band (S4). Here, when a real number type 9/7 irreversible filter is used as a wavelet filter, inverse normalization is also applied. The image data processing device 180 then applies color lightening processing to data as obtained by executing collection of brightness and color difference coefficients (S5), and further applies inverse wavelet transformation processing thereto per tile (S6). The image data processing device 180 then applies inverse color conversion and DC inverse level shifting processes to each pixel data having undergone the transformation (S7). When a monochromatic output is chosen (Yes in step S8), the image data processing device 180 finally executes monochrome processing (S9).

When a decoding process is executed to display the above-described preview screen, the image data obtained in step S7 is sent to the control unit 100 omitting the process of the step S5.

Figure 31:
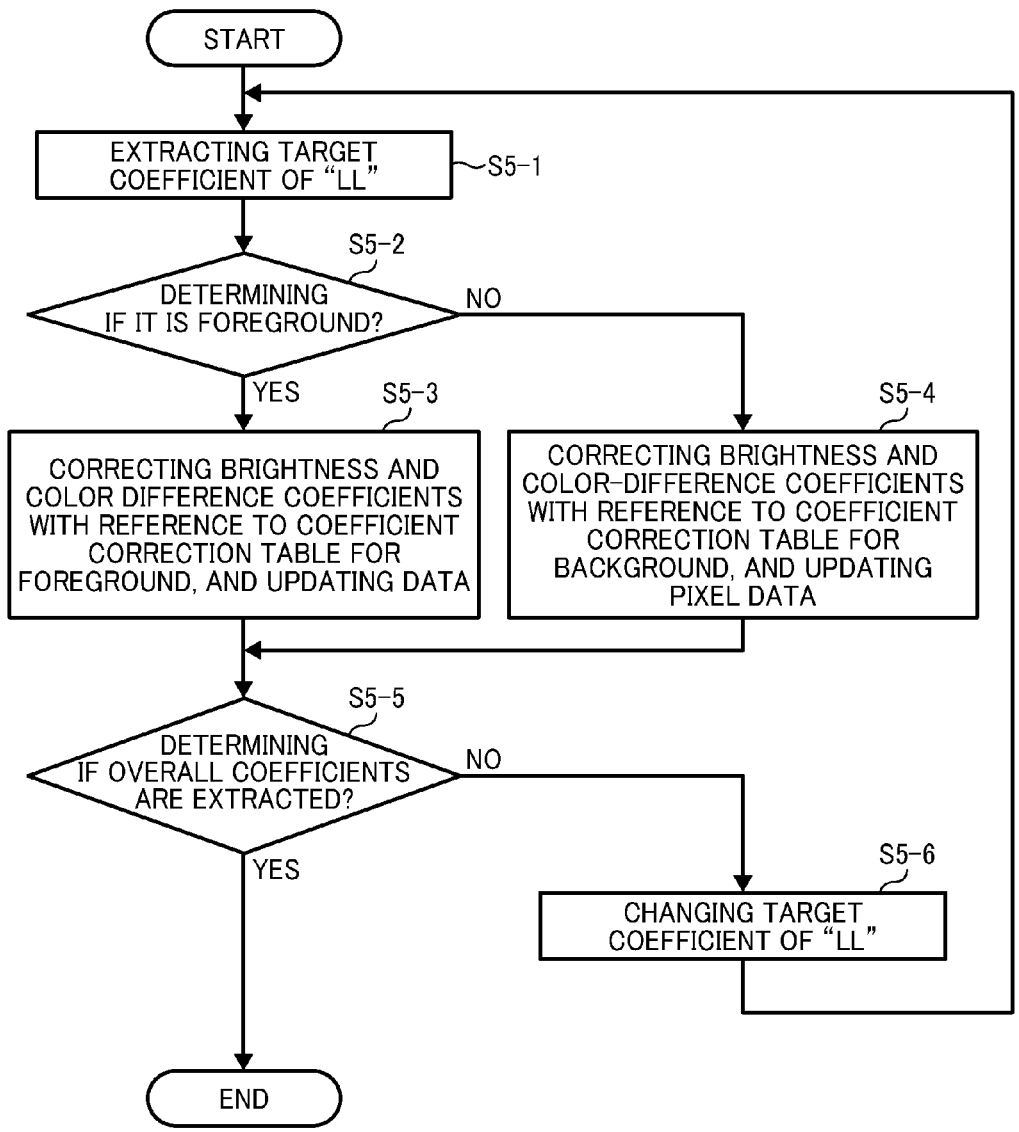
FIG. 31 is a flowchart illustrating a more detailed color lightening process executed in the printer.

FIG. 31 is a flowchart illustrating a more detailed process of the color lightening process executed in the printer according to the second embodiment. In the color lightening processing, a target coefficient of data among multiple coefficients (e.g. brightness or color difference coefficients) in the sub-band LL pixel matrix having undergone the inverse quantization is initially Extracted (S5-1). When the data is foreground data (Y in S5-2), a brightness coefficient or a color diff coefficient is corrected based on a brightness coefficient correction table or a color diff coefficient correction table for a foreground Stored in the data storage circuit, and the data is updated (S5-3). Whereas, when the data is background data (No in S5-2), the image data processing device 180 corrects a brightness coefficient or a color diff coefficient of the data based on the brightness coefficient correction table or the color diff coefficient correction table for the background stored in the data storage circuit, and updates the data (S5-4). The image data processing device 180 then determines whether or not all of the brightness coefficients or the color diff coefficients in the sub-band LL are extracted (S5-5). When a not-extracted coefficient remains (No in S5-5), the image data processing device 180 loops the control sequence with the step S5-1 after shifting a target coefficient in the sub-band LL (S5-6).

Figure 32:
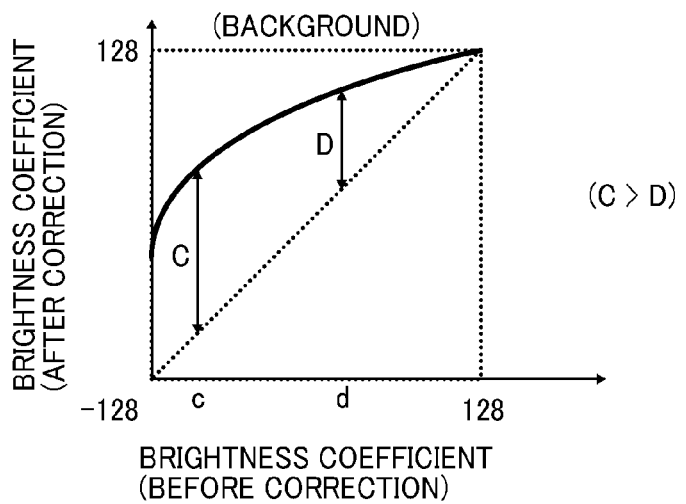
FIG. 32 is a graph illustrating a relation between a brightness before correction and that after correction stored in a brightness coefficient correction table for a background used in the printer.

FIG. 32 is a graph that shows a relation between brightness values before and after correction stored in a brightness coefficient correction table for a background. As shown, in the background brightness coefficient correction, the brightness is corrected under a rule such that as an original brightness positively increases a growth rate of the increased brightness decreases. Further, as shown, a growth rate C of the brightness "c" is greater than the growth rate D of the brightness "d" greater than the brightness "c" on the positive side.

Figure 33:
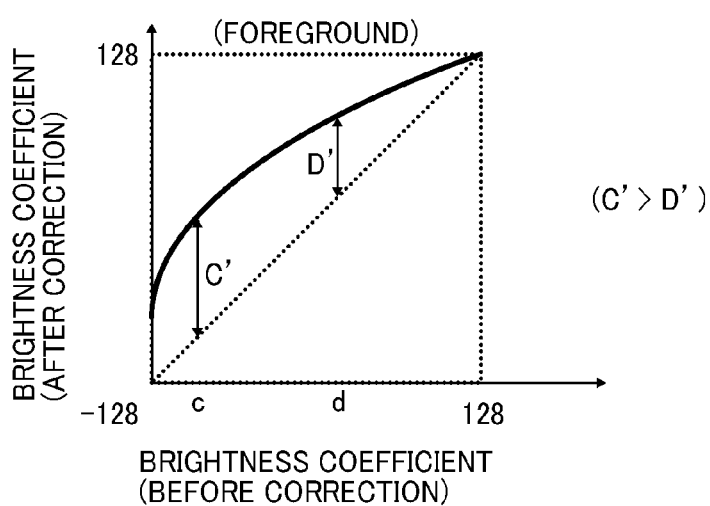
FIG. 33 is a graph illustrating a relation between a brightness before correction and that after correction stored in a brightness coefficient correction table for a foreground used in the printer.

FIG. 33 is a graph that shows a relation between brightness values before and after correction stored in a brightness coefficient correction table for a foreground. As shown, also in the foreground brightness coefficient correction, brightness is corrected under a rule such that as an original brightness positively increases a growth rate of the correspondingly increased brightness decreases. Further, as shown, a growth rate C' of the brightness "c" is greater than the growth rate D' of the brightness "d" greater than the brightness "c" on the positive side.

Figure 34:
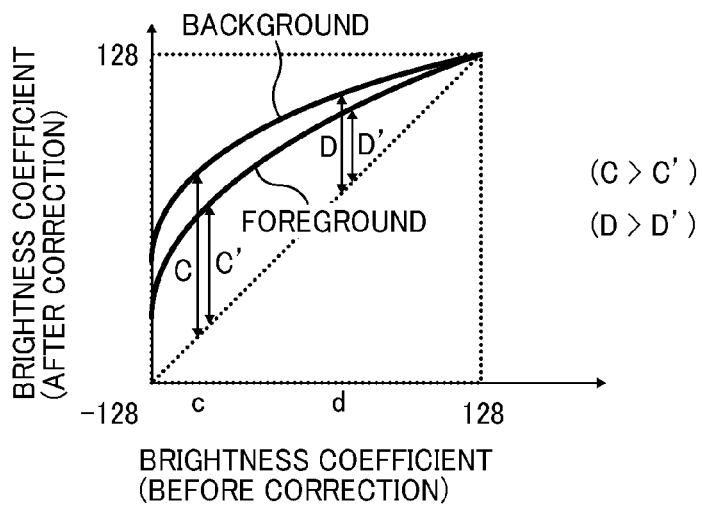
FIG. 34 is a graph obtained by superposing a graph of FIG. 32 on that of FIG. 33.

FIG. 34 is a superposition of respective graphs of FIGS. 32 and 33. As shown, at the same brightness coefficient (e.g. "c"), a growth rate (for example C) in the background is greater than a growth rate (e.g. C') in the foreground. Specifically, the below described inequality is met. Original brightness<Foreground brightness<Background brightness.

FIG. 33 is a graph that shows a relation between color differences before and after correction stored in a color difference coefficient correction table for a background. As shown, in the color difference coefficient correction for the background, an absolute value of the color difference coefficient is decreased under a rule such that as an absolute value of a color difference increases a reduction rate of the correspondingly decreased absolute value increases. Further, as shown, a reduction rate F of the color difference coefficient "f" is higher than a reduction rate E of the color difference coefficient "e" having a smaller absolute value than the color difference coefficient "f".

Figure 36:
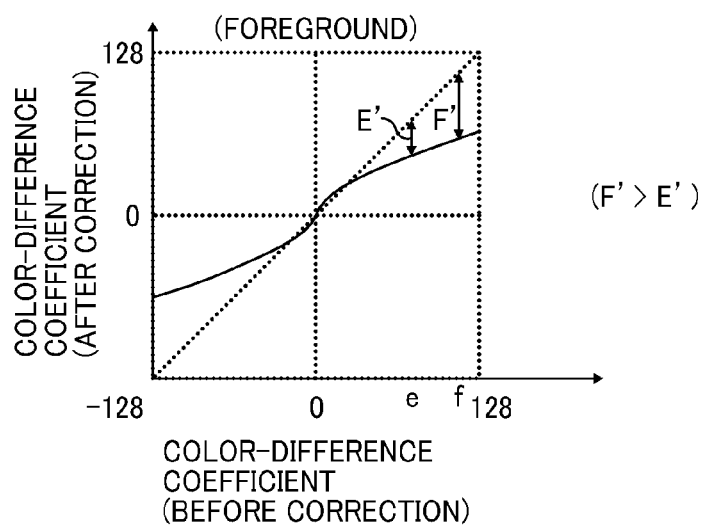
FIG. 36 is a graph illustrating a relation between a color difference before correction and that after correction stored in a color difference coefficient correction table for a foreground used in the printer.

FIG. 36 is a graph that shows a relation between color differences before and after correction stored in a color difference coefficient correction table for a foreground. As shown, also in the color difference coefficient correction for the foreground, an absolute value of the color difference coefficient is decreased under a rule such that as an absolute value of a color difference increases a reduction rate of the correspondingly decreased absolute value increases. Further, as shown, a reduction rate F' of the color difference coefficient "f" is higher than a reduction rate E' of the color difference coefficient "e" having a smaller absolute value than the color difference coefficient "f".

Figure 35:
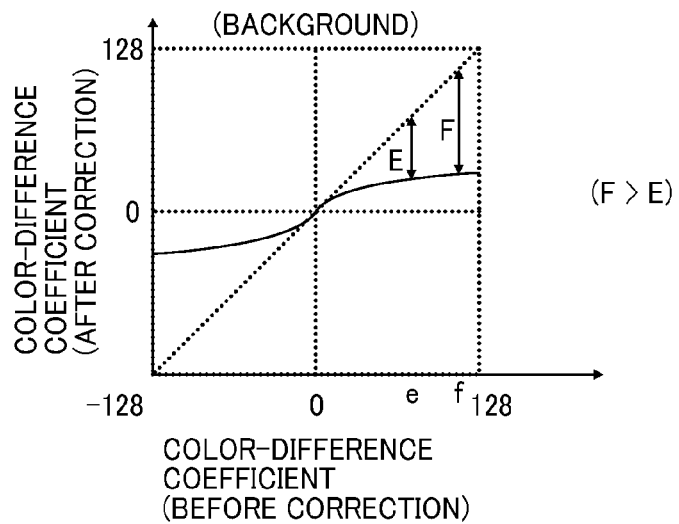
FIG. 35 is a graph illustrating a relation between a color difference before correction and that after correction stored in a color difference coefficient correction table for a background used in the printer.
Figure 37:
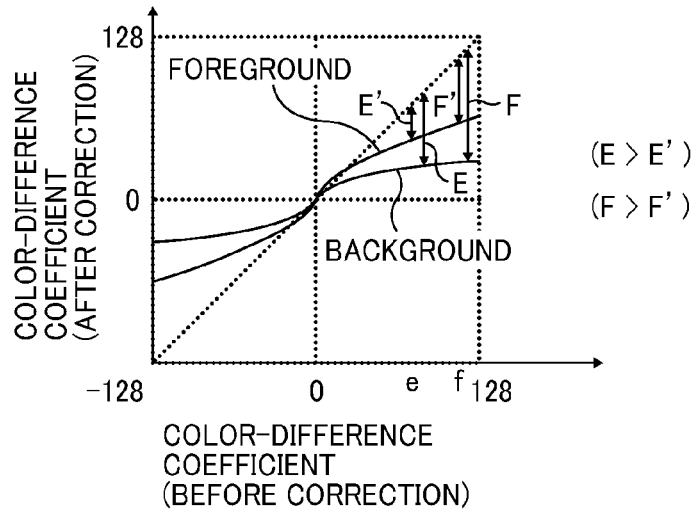
FIG. 37 is a graph obtained by superposing a graph of FIG. 35 on that of FIG. 36.

FIG. 37 is a superposition of respective graphs of FIGS. 35 and 36. As shown, at the same color difference coefficient (e.g. "f"), a reduction rate (for example, F) in the background is greater than a reduction rate (e.g. F') in the foreground.

By using each of the coefficient correction tables, the foreground data can be processed so that a hue (or a shade) of the foreground image is lightened less than that of the background image.

Among four types of coefficients (of the sub-bands) LL, HL, LH, and HH, a percentage of the coefficient of the sub-band LL of all coefficients is very small. For example, when the number of multi-layers is two, a percentage of the sub-band 2LL of all coefficients (of the sub-bands 1HL, 1LH, 1HH, 2HL, 2LH, 2HH, and 2LL) is $1/16$. Thus, in the N number order multi-layer, a percentage of an applicable coefficient of the sub-band LL. is $1/2^{(N\times 2)}$. Thus, in the printer of the second embodiment, by only applying color lightening processing to the coefficient of the sub-band LL. of the small number in this way, a processing time can be reduced in comparison with a situation when it is applied to all of the coefficients.

Although an example of only applying color lightening processing to the coefficient of the sub-band LL. is described heretofore, only coefficients of a layer higher than a prescribed level can undergo the color lightening processing. In such situation a processing time can be reduced again in comparison with the situation when the color lightening processing is applied to all of the coefficients.

Now, an image data processing device 180 of a printer according to a third embodiment is described. The image data processing device 180 of this embodiment executes similar processing as the second embodiment when an integer type 5/3 reversible filter is used for data (i.e., foreground and background data) of a JPEG 2000 format included in JPM image data. By contrast, when a real number type 9/7 nonreversible filter is used, the image data processing device 180 of the printer of the third embodiment executes different processing from that of the printer of the second embodiment.

Figure 38:
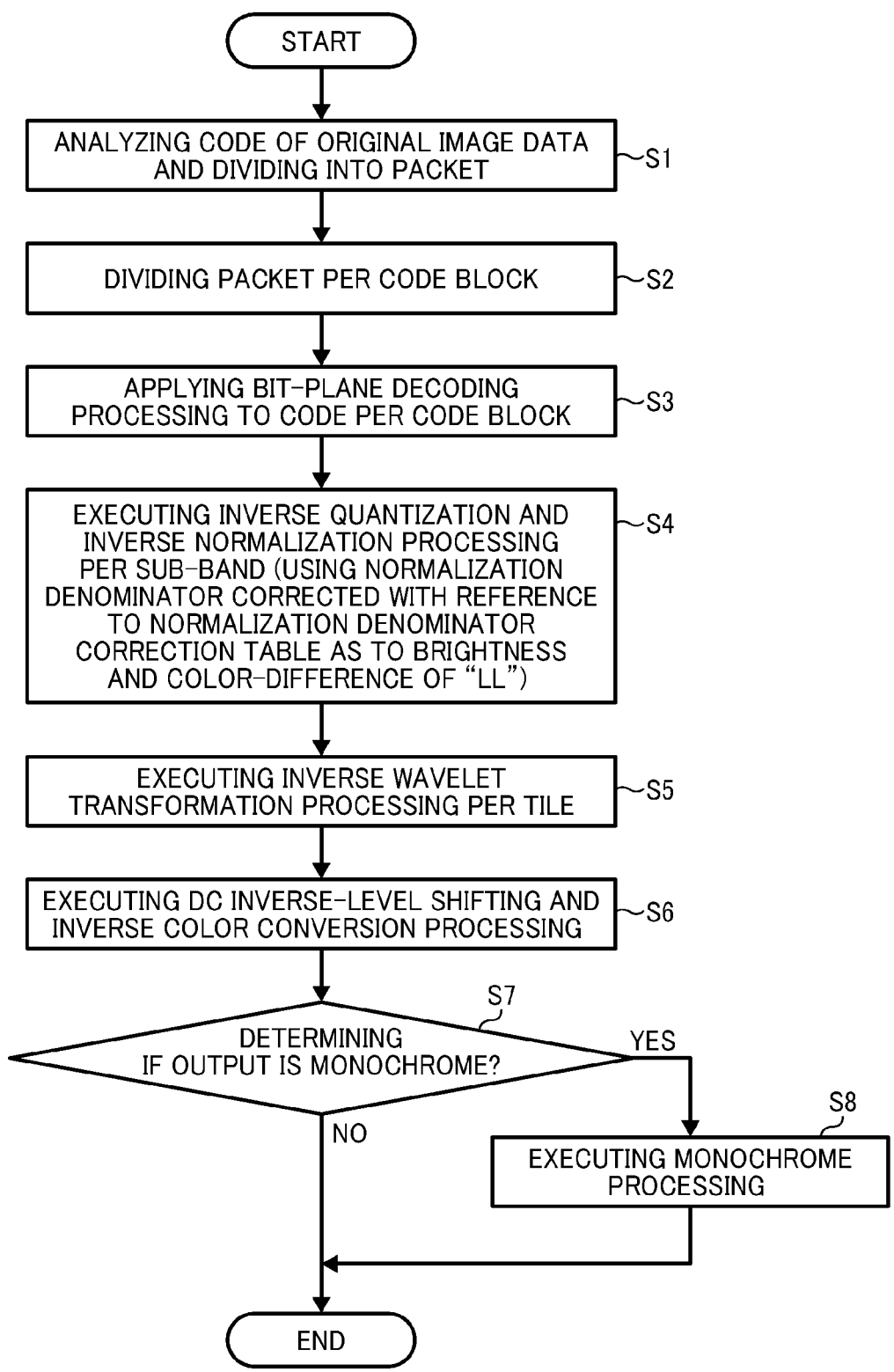
FIG. 38 is a flowchart illustrating a sequence of various processes applied to the foreground and background data pieces, which are compressed by a real number type-9/7 nonreversible filter, by an image data processing device provided in a printer according to a third embodiment.

Specifically, FIG. 38 is a flowchart illustrating a sequence of various processes applied by the image data processing device 180 of the printer of the third embodiment to background and foreground data pieces compressed by the real number type 9/7 nonreversible filter. As shown there, the image data processing device 180 initially parses codes of foreground and background data pieces of original image data, and divides the foreground and background data per packet at the same time (in step S1). The image data processing device 180 further divides each of the thus obtained multiple packets per code block (in step S2). The image data processing device 180 then decodes encoded data per code block (S3), and after that applies inverse quantization to the decoded data thus obtained per sub-band (S4). Inverse normalization is also applied per sub-band. At that moment, the image data processing device 180 applies color lightening processing by using a normalized denominator corrected based on a normalizing denominator correction table stored in a data storage circuit for a color difference coefficient of the sub-band LL. or a brightness coefficient of the sub-band LL. The image data processing device 180 then applies the inverse wavelet transformation to each of tiles (S5), and subsequently applies inverse color conversion and DC inverse level shifting processes to each pixel data having undergone the inverse wavelet transformation (S6). When a monochromatic output is chosen (Yes in step S7), the image data processing device 180 finally executes monochrome processing (S8).

When a decoding process is executed to display a preview screen as described above, the image data processing device 180 executes the reverse normalization process without correcting the normalized denominator for the brightness coefficient of the sub-band LL. or the color difference coefficient of the sub-band LL. in the step S4 like other coefficients.

Figure 39:
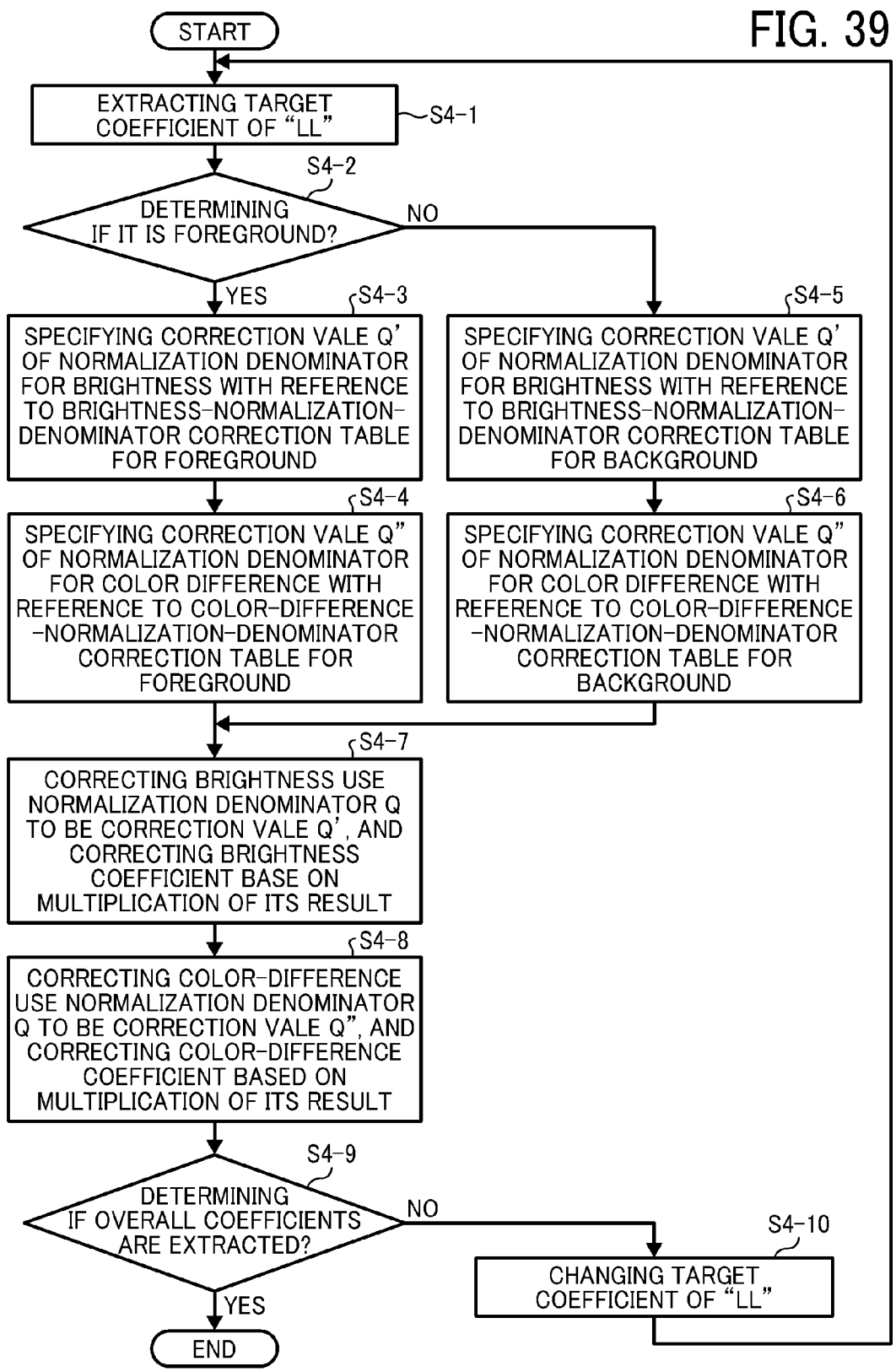
FIG. 39 is a flowchart illustrating an inverse normalization process of a sub-band LL of a component executed in the printer more in detailed.

FIG. 39 is a flowchart closely illustrating an inverse normalization process of a component (a sub-band) LL executed in the printer according to the third embodiment. As shown, in the inverse normalization process (i.e., a color lightening process), a target coefficient is initially extracted among multiple coefficients (i.e., brightness coefficients or color difference coefficients) having undergone the reverse normalization process per sub-band from the sub-band LL (S4-1). When the extraction is the foreground data (Yes in S4-2), a correction value Q' of the normalizing denominator for brightness use is specified based on a brightness normalizing denominator correction table for a foreground stored in the data storage circuit (S4-3). Subsequently, a correction value Q" of the normalizing denominator for color difference use is also specified based on a color difference normalizing denominator correction table for a foreground stored in the data storage circuit (S4-4). Whereas, when the extraction is the background data (No in S4-2), a correction value Q' of the normalizing denominator for brightness use is specified based on the brightness normalizing denominator correction table for a background use stored in the data storage circuit (S4-5). Subsequently, a correction value Q" of the normalizing denominator for color difference use is also specified based on a color difference normalizing denominator correction table for a background use stored in the data storage circuit (S4-6). In any of the foreground and background, the normalizing denominator Q for the brightness use is corrected to be equivalent to the correction value Q', and the brightness coefficient is corrected by multiplication of the correction value Q' (S4-7). The normalizing denominator Q for the color difference use is also corrected to be equivalent to the correction value Q", and the color difference coefficient is corrected by multiplication of the correction value Q" (S4-8). The image data processing device 180 then determines whether or not all of the brightness coefficients or color difference coefficients have been extracted from the sub-band LL (S4-9), and when a not extracted coefficient remains (No in S4-9), the image data processing device 180 loops the control sequence with the step S4-1 after shifting a target coefficient in the sub-band LL (S4-10).

Figure 40:
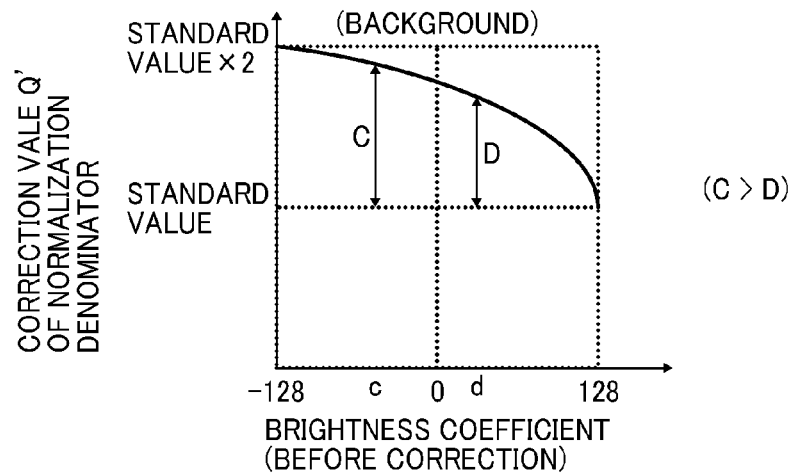
FIG. 40 is a graph illustrating a relation between a brightness coefficient before correction and a correction value Q' of a normalized denominator of a brightness stored in a brightness normalized denominator correction table for a background used in the printer.

FIG. 40 is a graph that shows a relation between a brightness coefficient before correction and a correction value Q' of a normalized denominator of a brightness stored in a brightness normalized denominator correction table for a background use. As shown, in the background brightness coefficient correction, a normalized denominator increases more than a standard value when a brightness coefficient is inversely normalized under a rule such that as an original brightness coefficient positively increases a growth rate of the increased brightness coefficient decreases. A growth rate C of the brightness "c" is greater than an increase rate D of a brightness "d" larger than the brightness "c" on the positive side.

Figure 41:
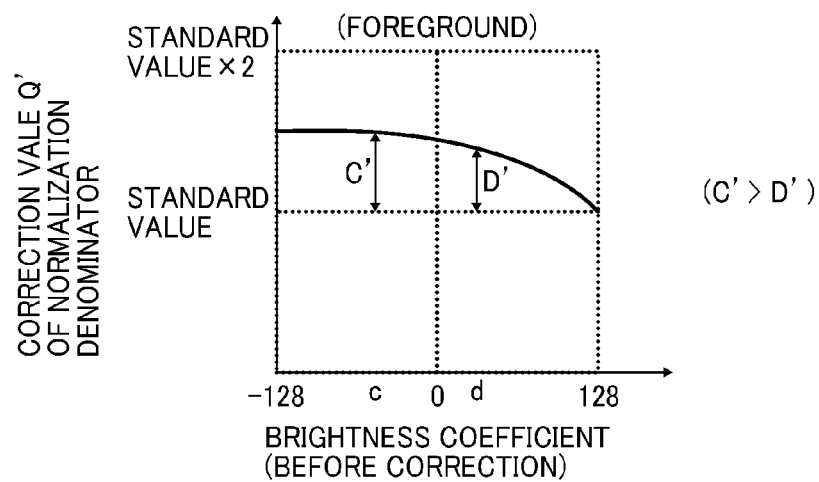
FIG. 41 is a graph illustrating a relation between a brightness coefficient before correction and a correction value Q' of a normalized denominator of a brightness stored in a brightness normalized denominator correction table for a foreground used in the printer.

FIG. 41 is a graph that shows a relation between a brightness coefficient before correction and a correction value Q' of a normalized denominator of a brightness stored in a brightness normalized denominator correction table for a foreground use. As shown, also in the foreground brightness coefficient correction, a normalized denominator increases more than a standard value when a brightness coefficient is inversely normalized under a rule such that as an original brightness coefficient positively increases a growth rate of the increased brightness coefficient decreases. A growth rate C' for the brightness "c" is greater than an increase rate D' for a brightness "d" larger than the brightness "c" on the positive side.

Figure 42:
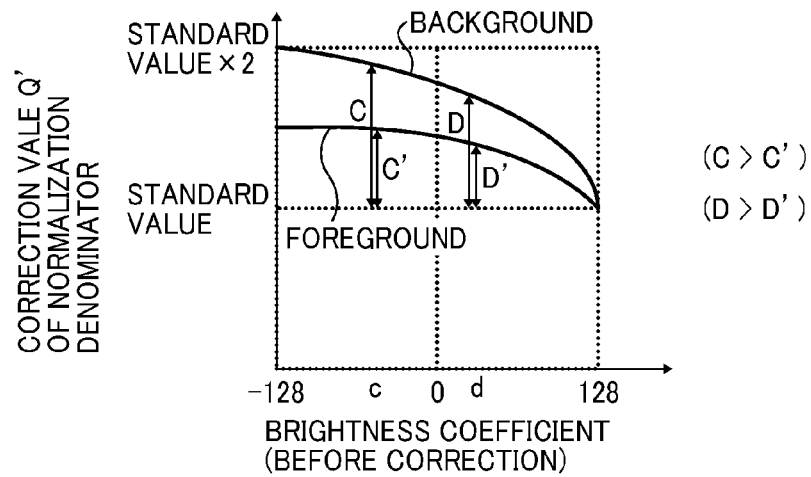
FIG. 42 is a graph obtained by superposing a graph of FIG. 40 on that of FIG. 41.

FIG. 42 is a superposition of respective graphs of FIGS. 40 and 41. As shown, at the same brightness coefficient (e.g. "c"), a growth rate (for example C) in the background is greater than a growth rate (e.g. C') in the foreground. Specifically, the below described inequality is established. Original brightness<Foreground brightness<Background brightness.

Figure 43:
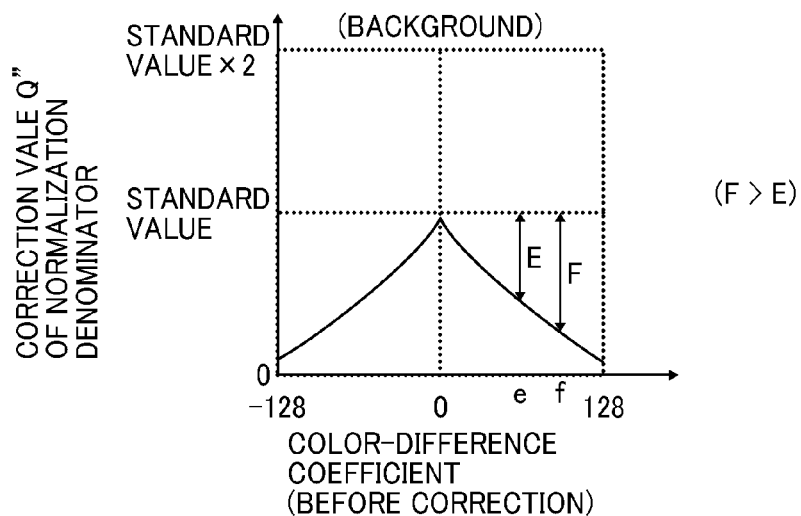
FIG. 43 is a graph illustrating a relation between a color difference coefficient before correction and a correction value Q" of a normalized denominator of a color difference stored in a color difference normalized denominator correction table for a background used in the printer.

FIG. 43 is a graph that shows a relation between a color difference before correction and a correction value Q" of a color difference normalized denominator stored in a color difference normalized denominator correction table for a background use. As shown, in the background brightness color difference coefficient correction, a normalized denominator increases more than a standard value when a color difference coefficient is inversely normalized under a rule such that as an absolute value of an original color difference coefficient increases a reduction rate of the correspondingly decreased absolute value increases. A reduction rate F of the color difference coefficient "f" is greater than a reduction rate E of a color difference coefficient "e" having the smaller absolute value than that of the color difference coefficient "f".

Figure 44:
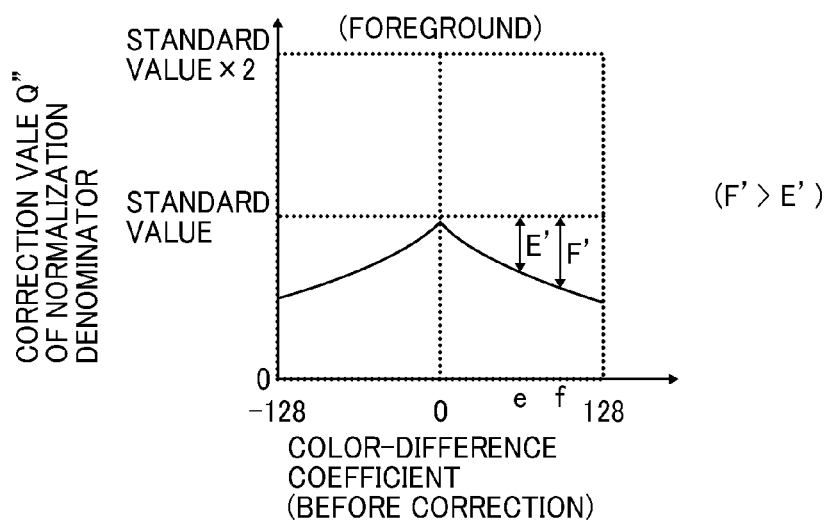
FIG. 44 is a graph illustrating a relation between a color difference coefficient before correction and a correction value Q" of a normalized denominator of a color difference stored in a color difference normalized denominator correction table for a foreground used in the printer.

FIG. 44 is a graph that shows a relation between a color difference before correction and a correction value Q" of a color difference normalized denominator stored in a color difference normalized denominator correction table for a foreground use. As shown, also in the foreground brightness color difference coefficient correction, an absolute value of a normalized denominator increases more than a standard value when a color difference coefficient is inversely normalized under a rule such that as an absolute value of an original color difference coefficient increases a reduction rate of the decreased absolute value increases. A reduction rate F' of the color difference coefficient "f" is greater than a reduction rate E' of a color difference coefficient "e" having the smaller absolute value than that of the color difference coefficient "f".

Figure 45:
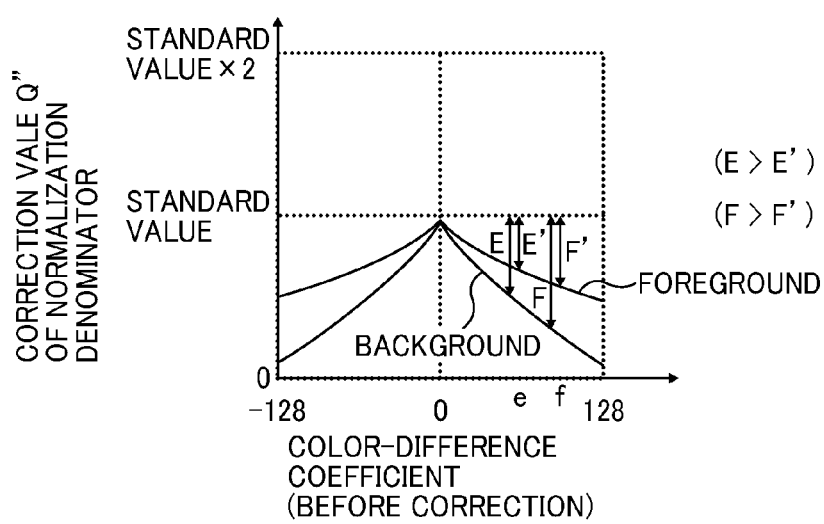
FIG. 45 is a graph obtained by superposing a graph of FIG. 43 on that of FIG. 44.

FIG. 45 is a superposition of respective graphs of FIGS. 43 and 44. As shown, at the same brightness coefficient value (e.g. f), a growth rate (for example F) in the background is greater than a growth rate (e.g. F') in the foreground.

By using the brightness coefficient correction table, the foreground data can be processed such that a hue (or a shade) of the foreground image is lightened less than that of the background image.

Among four types of coefficients of the sub-band LL, HL, LH, and HH, a percentage of the coefficient of the sub-band LL of all coefficients is very small. For example, when the number of the multi-layers is two, a percentage of the sub-band 2LL of all coefficients (of the sub-bands 1HL, 1LH, 1HH, 2HL, 2LH, 2HH, and 2LL) is $1/16$. When the number of the multi-layers is "N", a percentage of an applicable coefficient of the sub-band LL is $1/2(N\times 2)$. In the printer of the third embodiment, by only applying color lightening processing to the coefficients of the sub-band LL of the small numbers in this way, a processing time can be reduced in comparison with a situation when it is applied to all of the coefficients.

Although an example of only applying color lightening processing to the coefficient of the sub-band LL. is described above, only coefficients of a higher layer than a prescribed level can undergo the color lightening processing. In such a situation, a processing time can be again reduced in comparison with the situation when the color lightening processing is applied to all of the coefficients.

Here to fore, in the various embodiments, the present invention is applied to a printer including an image data processing device as described. However, the present invention can also be applied to program for software use and a recording medium, such as optical disk, etc., storing software. For example, image viewer software for showing an image on a display by reading an electronic file of image data stored in a recording medium can adopt the present invention. Further, program and a recording medium operating a computer as an image data processing device of software can also adopt the present invention to edit an image beside displaying thereof. Specifically, in a default condition, structured image data of JPM or the like is reproduced on a display as is. Whereas, when a color material saving mode is selected and a reproduced image of PDL is outputted to a printer, the PDL is not outputted as is but an image is reproduced again by undergoing color lightening processing. Subsequently, a PDL corresponding to a twice reproduced image is outputted to the printer.

Figure 46:
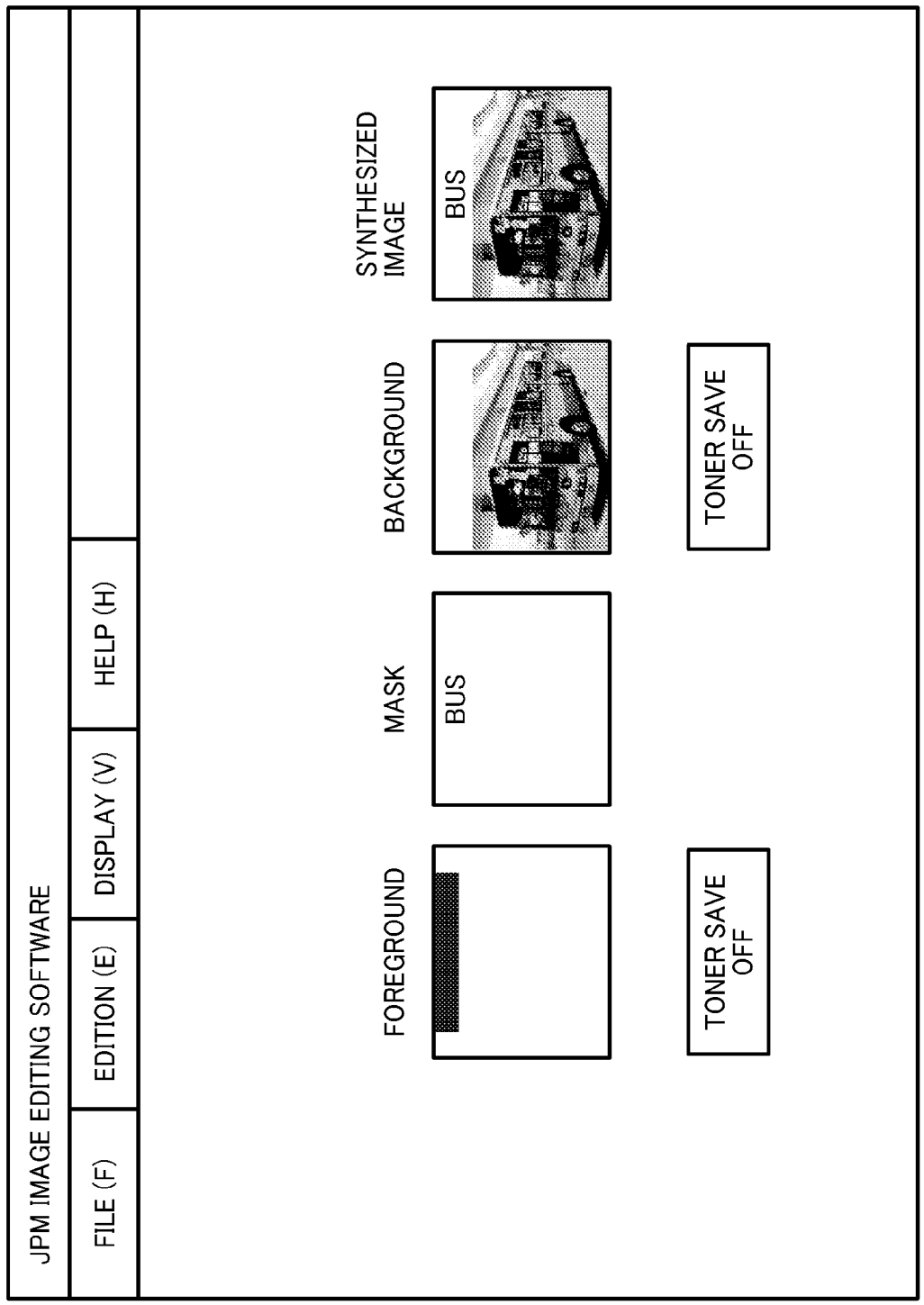
FIG. 46 is a schematic view illustrating a first example of a screen displayed by an image editing software according to one embodiment.

FIG. 46 is a schematic view illustrating one example of a screen displayed by image-editing software boosted by program according to one embodiment of the present invention. Specifically, upon reading a JPM image data file, image-editing software displays a foreground, a mask, a background, and a composite image side by side based on the JPM. In the initial state, a foreground, a background, and a synthetic image are displayed without giving the color lightening processing to the foreground or the background. Below the foreground image and the background image, toners save mode switching buttons are displayed as shown, respectively. Because the toner save mode is turned OFF in the initial state, a character of "OFF" is displayed on each of the toner save mode switching buttons.

Figure 47:
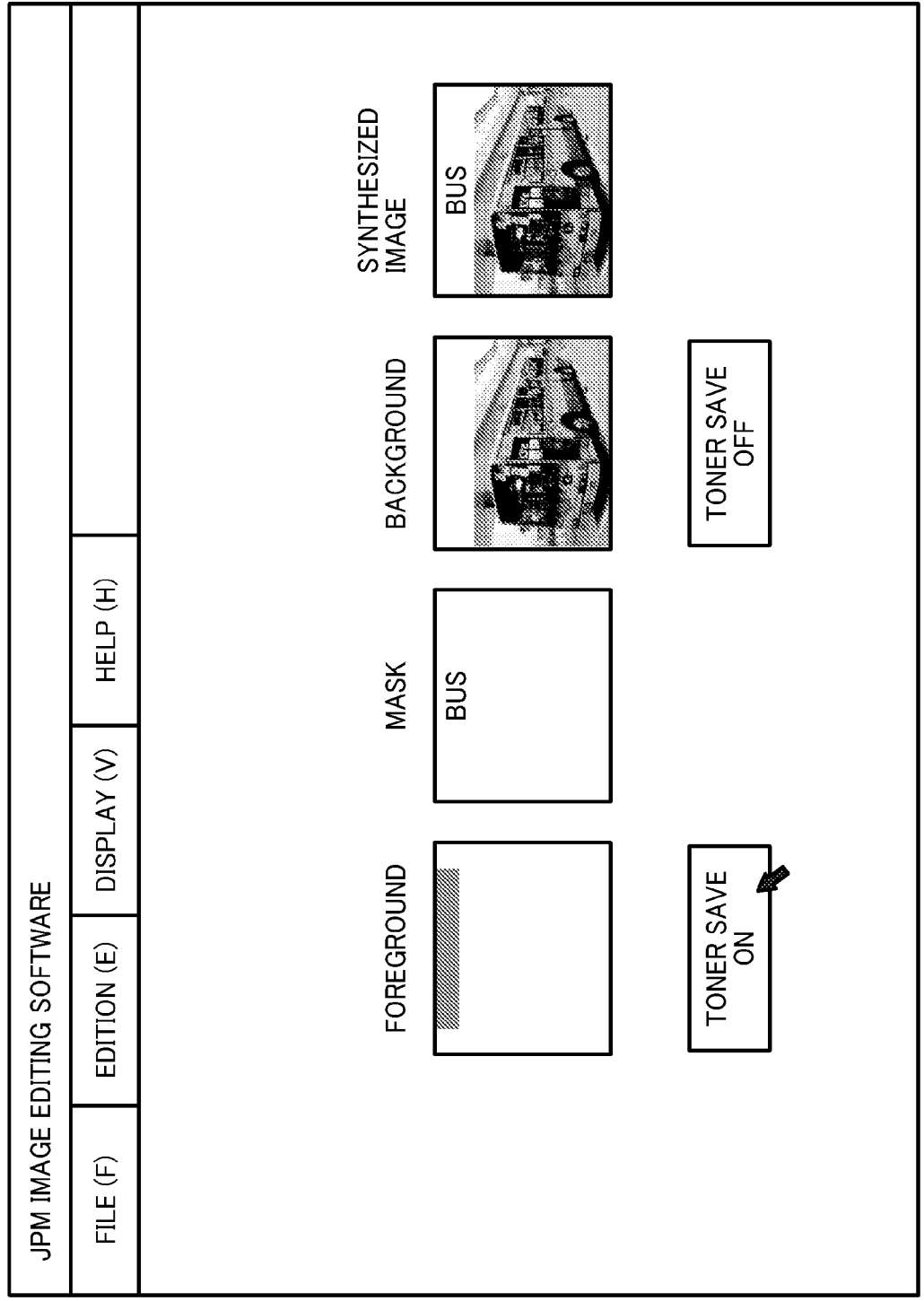
FIG. 47 is a schematic view illustrating a second example of the screen.

When the toner save mode switch button disposed below the foreground image is clicked, a character on the toner save mode switch button is switched from "OFF" to "ON" as shown in FIG. 47. At the same time, the color lightening processing is applied to the foreground data, and a lightened color foreground image is displayed. Further, a character "bus" as a composite foreground image is also displayed being lightened.

Figure 48:
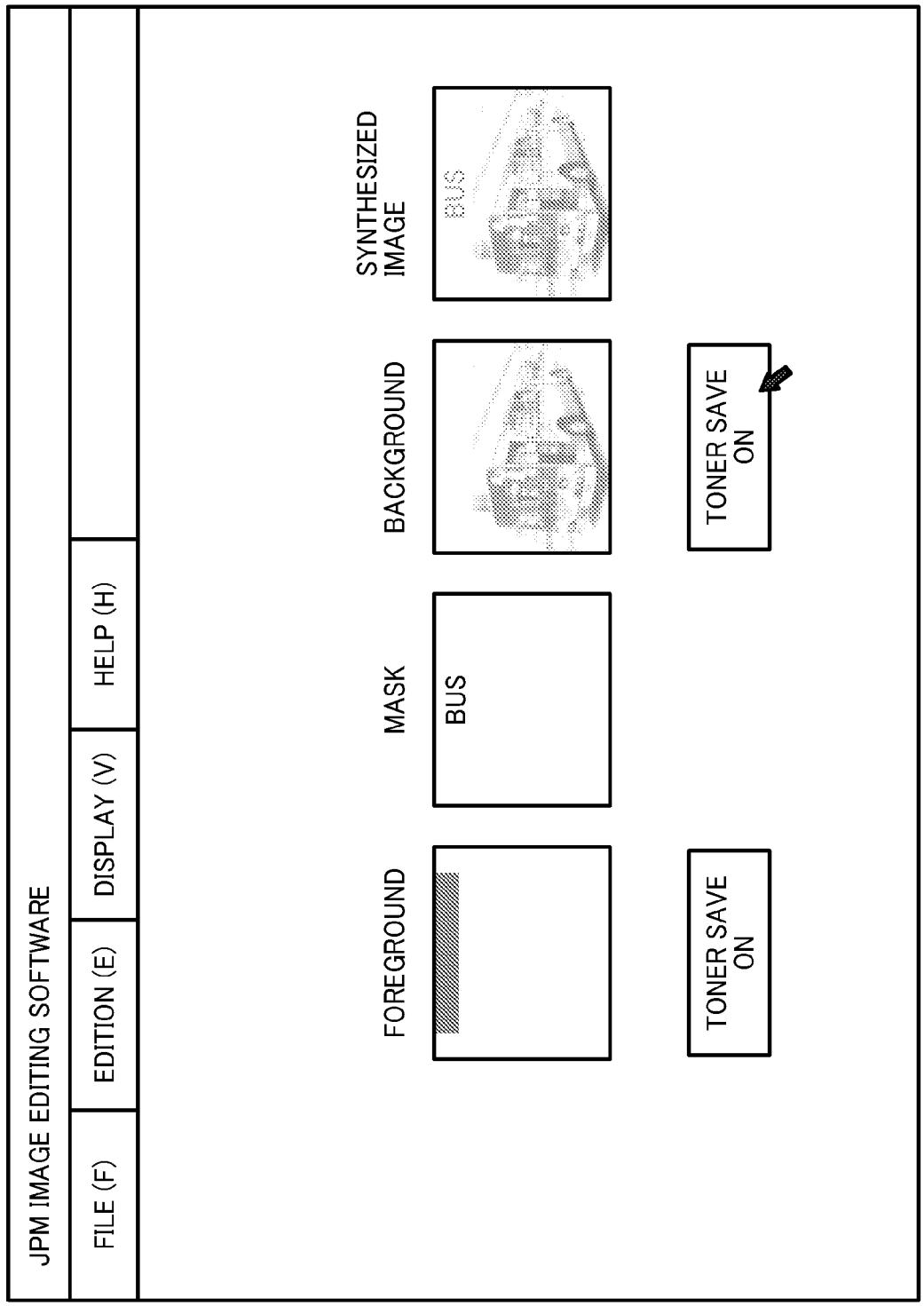
FIG. 48 is a schematic view illustrating a third example of the screen.

Subsequently, when the toner save mode switch button disposed below the background image is clicked, the character on the toner save mode switch button is switched from "OFF" to "ON" as shown in FIG. 48. At the same time, the color lightening processing is applied to the background data, and a lightened color background image is displayed.

Figure 49:
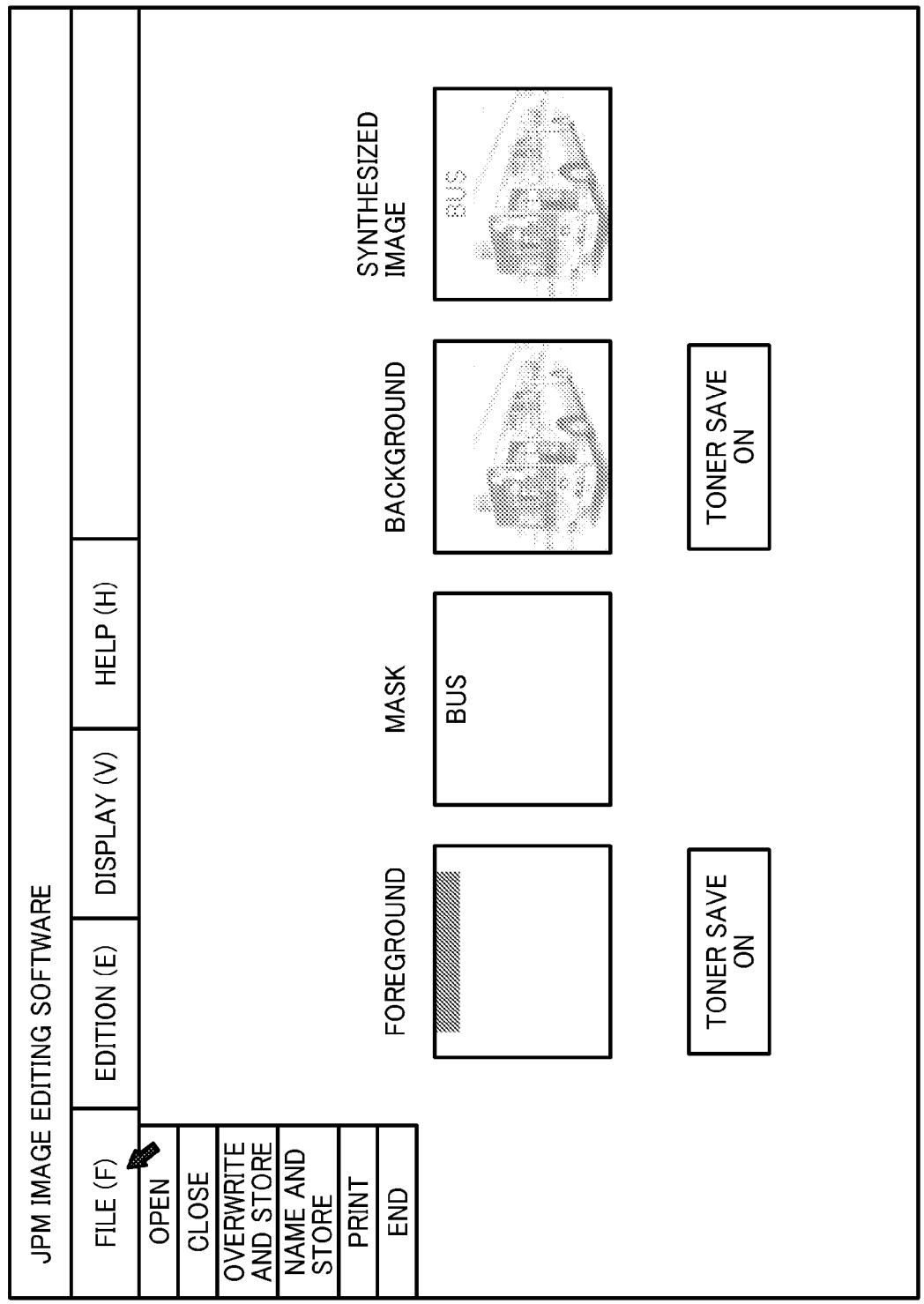
FIG. 49 is a schematic view illustrating a fourth example of the screen.

In such a situation, when clicking is made in an order from "file" to "print" as shown in FIG. 49, PDL data to generate the composite image of the foreground and the background having undergone color lightening processing is outputted from image editing software to a multifunctional machine.

Hence, according to the present invention, below described advantage is obtained per specific embodiment.

According to one embodiment of the present invention, an amount of color material used in forming a foreground image can be reduced accentuating the foreground image than a background image by lightening a shade of the foreground by a degree less than that of the background image. Accordingly, toner consumption can be reduced even when the foreground image has a relatively high area ratio. Because, an image data processing device applies data processing to structured image data including background image data representing a background image, foreground image data representing a foreground image indicating a color and a gross shape, and mask data representing a mask image specifying a prescribed area of the foreground image to be overlaid on the background image. Such image data processing device lightens a shade of the background image by applying background color lightening processing to background data, and lightens a shade of the foreground image less than the shade of the background image by applying foreground color lightening processing to the foreground data.

According to another embodiment, color toner consumption can be reduced when an image is formed due to color lightening by increasing brightness. Because, the background and foreground images are lightened by increasing a brightness of the background and foreground images, respectively.

According to yet another embodiment, color toner consumption can be effectively reduced when an image is formed due to color lightening by increasing a brightness and decreasing a color difference. Because, the shades of the background image and the foreground images are lightened by increasing a brightness while decreasing a color difference of those, respectively.

According to yet another embodiment, a color difference and a brightness can be uniformed over the entire foreground and background. Because, a background color lightening process and a foreground color lightening processing are executed in such a manner that as an original brightness decreases a growth rate of a correspondingly increased brightness increases and as an original color difference increases a growth rate of a correspondingly decreased color difference decreases.

According to yet another embodiment, shades of background and foreground images can be lightened by applying data processing to each pixel data having undergone discrete wavelet inverse transformation. Because, brightness of both foreground and 1background images are increased by increasing a brightness of pixel data.

According to yet another embodiment, shades of background and foreground images can be lightened by applying data processing to data before undergoing discrete wavelet inverse transformation. Further, brightness uniformity can be obtained over a foreground and a background. Because, multiple color coefficient data series are generated per frequency band by applying discrete wavelet transformation to each of the background data and foreground data, respectively, and a brightness coefficient increasing process is only applied to a color coefficient data series corresponding to the lowest frequency band (e.g. a sub-band LL). Further because, a brightness coefficient is corrected under a rule such that as an original brightness coefficient positively increases a growth rate of an increased brightness coefficient decreases.

According to yet another embodiment, shades of background and foreground images can be lightened by applying data processing to data before undergoing discrete wavelet inverse transformation. Further, brightness uniformity over the foreground and the background can be obtained. Because, multiple normalized color coefficient data series are generated in a normalized state per frequency band by applying discrete wavelet transformation to each of the background data and foreground data, and a brightness coefficient increasing process is only applied to a normalized color coefficient data series corresponding to the lowest frequency band (e.g. a sub-band LL). Further because, a normalizing denominator is increased above a standard value when the brightness coefficient is inversely normalized under a rule that as an original brightness coefficient positively increases a growth rate of the increased brightness coefficient decreases.

According to yet another embodiment, a brightness increasing process can be quickly completed more than when it is conducted to sets of coefficient series of all layers. Because, when image data includes multiple sets of color coefficient data series generated per frequency band by repeatedly applying discrete wavelet transformation to each of the background data and foreground data, and multiple sets of normalized color coefficient data series generated in a normalized state per frequency band by repeatedly applying discrete wavelet transformation to each of the background data and foreground data, a brightness coefficient increasing process is only applied to a set of coefficient data series higher than a prescribed layer.

According to yet another embodiment, a color difference coefficient decreasing process can be quickly completed more than when it is conducted to all of color coefficient series. Further, color difference uniformity over the foreground and the background can be obtained. Because, multiple color coefficient series are generated per frequency band by applying discrete wavelet transformation to each of the background data and foreground data, and a color difference coefficient decreasing process is only applied to a color coefficient series corresponding to the lowest frequency band. Further because, an absolute value of a color difference coefficient is decreased under a rule that as an absolute value of an original color coefficient increases a reduction rate of a decreased absolute brightness coefficient increases.

According to yet another embodiment, a color difference coefficient decreasing process can be quickly completed more than when it is conducted to all of normalized color coefficient series. Further, color difference uniformity over the foreground and the background can be obtained. Because, multiple normalized color coefficient series are generated in a normalized state per frequency band by applying discrete wavelet transformation to each of the background data and foreground data and a color difference coefficient decreasing process is only applied to a normalized color coefficient series corresponding to the lowest frequency band. Further because, an absolute value of a normalizing denominator is increased above a standard value when a color coefficient is inversely normalized under a rule that as an absolute value of an original color difference coefficient increases a reduction rate of a decreased brightness coefficient increases.

According to yet another embodiment, a color difference coefficient decreasing process can be quickly completed more than when it is conducted to coefficient series of all of layers. Because, when image data includes multiple sets of color coefficient series generated per frequency band by repeatedly applying discrete wavelet transformation to each of the background data and foreground data, and multiple sets of normalized color coefficient series generated in a normalized state per frequency band by repeatedly applying discrete wavelet transformation to each of the background data and foreground data as well, a color coefficient decreasing process is only applied to a set of coefficient series higher than a prescribed layer.

According to yet another embodiment, two modes in which a color lightening process is applied to both background and foreground or that is applied only to one of them can be selectively provided to a user in accordance with user's preference.

Numerous additional modifications and variations of the present invention are possible in light of the above teachings. It is therefore to be understood that within the scope of the appended claims, the present invention may be practiced otherwise than as specifically described herein.

What is claimed is:

1. An image data processing device for processing structured image data including background image data representing a background image, foreground image data representing a foreground image indicating a color and a gross shape, and mask data representing a mask image specifying a prescribed area of the foreground image to be overlaid on the background image, the image data processing device comprising:
   a processing unit to lighten a shade of the background image by applying a background color lightening process to the background data, and to lighten a shade of the foreground image less than the shade of the background image by applying a foreground color lightening process to the foreground data,
   wherein a plurality of color coefficient series is generated, one series per frequency band, by applying discrete wavelet transformation to each of the background data and foreground data,
   wherein a brightness coefficient increasing process is applied only to a color coefficient series corresponding to a relatively lowest frequency band, and
   wherein, as an original brightness coefficient positively relatively increases a growth rate of the increased brightness coefficient relatively decreases.

2. The image data processing device as claimed in claim 1, wherein the background image and the foreground image are lightened by increasing brightness of the background and foreground images, respectively.

3. The image data processing device as claimed in claim 2, wherein the shades of the background image and the foreground image are lightened by increasing brightness while decreasing a color difference of the background image and the foreground image, respectively.

4. The image data processing device as claimed in claim 3, wherein the background color lightening process and the foreground color lightening process are executed in such a manner that as an original brightness decreases, a growth rate of a correspondingly increased brightness increases and as an original color difference increases a growth rate of a correspondingly decreased color difference decreases.

5. The image data processing device as claimed in claim 4, wherein the brightness of the foreground image and the background image are increased by increasing a brightness of pixel data.

6. The image data processing device as claimed in claim 4, wherein a plurality of normalized color coefficient series is generated in a normalized state, one series per frequency band, by applying discrete wavelet transformation to each of the background data and foreground data,
   wherein a brightness coefficient increasing process is applied only to a normalized color coefficient series corresponding to the lowest frequency band,
   wherein a normalizing denominator is increased above a prescribed standard value by a rule that as an original brightness coefficient positively increases a growth rate of the increased brightness coefficient decreases when the brightness coefficient is inversely normalized.

7. The image data processing device as claimed in claim 4, wherein image data includes multiple sets of color coefficient series generated, one set per frequency band, by repeatedly applying discrete wavelet transformation to each of the background data and foreground data, and multiple sets of normalized color coefficient series generated in a normalized state by repeatedly applying discrete wavelet transformation to each of the background data and foreground data,
   wherein a brightness coefficient increasing process is only applied to a set of coefficient series higher than a prescribed layer.

8. The image data processing device as claimed in claim 4, wherein multiple color coefficient series are generated, one series per frequency band, by applying discrete wavelet transformation to each of the background data and the foreground data,
   wherein a color difference coefficient decreasing process is applied only to a color coefficient series corresponding to the lowest frequency band,
   wherein an absolute value of a color difference coefficient is decreased by a rule that as an absolute value of an original color coefficient increases a reduction rate of the decreased absolute brightness coefficient increases.

9. The image data processing device as claimed in claim 4, wherein a plurality of normalized color coefficient series is generated in a normalized state, one series per frequency band, by applying discrete wavelet transformation to each of the background data and the foreground data,
   wherein a color difference coefficient decreasing process is applied only to a normalized color coefficient series corresponding to the lowest frequency band,
   wherein an absolute value of a normalizing denominator is increased above a prescribed standard value by a rule that as an absolute value of an original color difference coefficient increases a reduction rate of a decreased brightness coefficient increases when a color coefficient is inversely normalized.

10. The image data processing device as claimed in claim 8, wherein image data includes at least two groups of multiple color coefficient series generated, one series per frequency band, by repeatedly applying discrete wavelet transformation to each of the background data and the foreground data, and multiple sets of normalized color coefficient series generated in a normalized state, one series per frequency band, by repeatedly applying discrete wavelet transformation to each of the background data and the foreground data,
    wherein a color coefficient decreasing process is only applied to a set of coefficient series higher than a prescribed layer.

11. The image data processing device as claimed in claim 1, further comprising:
    a controller to switch between a first mode in which only the background color lightening processing is executed and a second mode in which the foreground and background color lightening processes are executed based on an instruction from a user.

12. An image formation apparatus, comprising: a structured image data acquisition device to acquire structured image data; the image data processing device as claimed in claim 1, to apply a prescribed processing to the structured image data acquired by the structured image data acquisition device; and
    an image forming device to form an image based on the structured image data acquired by the structured image data acquisition device.

13. The image data processing device as claimed in claim 12, wherein the background image and the foreground image are lightened by increasing brightness of the background and foreground images, respectively.

14. The image data processing device as claimed in claim 13, wherein the shades of the background image and the foreground image are lightened by increasing brightness while decreasing a color difference of the background image and the foreground image, respectively.

15. The image data processing device as claimed in claim 14, wherein the background color lightening process and the foreground color lightening process are executed in such a manner that as an original brightness decreases, a growth rate of a correspondingly increased brightness increases and as an original color difference increases a growth rate of a correspondingly decreased color difference decreases.

16. The image data processing device as claimed in claim 15, wherein the brightness of the foreground image and the background image are increased by increasing a brightness of pixel data.

17. The image data processing device as claimed in claim 15, wherein a plurality of color coefficient series is generated, one series per frequency band, by applying discrete wavelet transformation to each of the background data and foreground data, and a brightness coefficient increasing process is applied only to a color coefficient series corresponding to the lowest frequency band,
    wherein as an original brightness coefficient positively increases a growth rate of the increased brightness coefficient decreases.

18. The image data processing device as claimed in claim 16, wherein a plurality of normalized color coefficient series is generated in a normalized state, one series per frequency band, by applying discrete wavelet transformation to each of the background data and foreground data,
    wherein a brightness coefficient increasing process is applied only to a normalized color coefficient series corresponding to the lowest frequency band,
    wherein a normalizing denominator is increased above a prescribed standard value by a rule that as an original brightness coefficient positively increases a growth rate of the increased brightness coefficient decreases when the brightness coefficient is inversely normalized.

19. A non-transitory computer-readable medium storing a program that, when executed by a computer, causes the computer to execute the steps of:
    generating structured image data based on background and foreground data representing background and foreground images, respectively, and mask data representing a mask image specifying a prescribed area of the foreground image to be overlaid on the background image, the foreground image indicating a color and a gross shape on the background image;
    lightening a shade of a background image by applying a background color lightening process to background data representing the background image;
    lightening a shade of the foreground image less than a shade of the background image by applying a foreground color lightening process to the foreground data,
    generating a plurality of color coefficient series, one series per frequency band, by applying discrete wavelet transformation to each of the background data and foreground data; and
    applying a brightness coefficient increasing process only to a color coefficient series corresponding to a relatively lowest frequency band, wherein, as an original brightness coefficient positively relatively increases, a growth rate of the increased brightness coefficient relatively decreases.

20. An image data processing method for processing structured image data including background image data representing a background image, foreground image data representing a foreground image indicating a color and a gross shape, and mask data representing a mask image specifying a prescribed area of the foreground image to be overlaid on the background image, the image data processing method comprising:

using a processing unit to perform the steps of:
lightening a shade of the background image by applying a background color lightening process to the background data;
lightening a shade of the foreground image less than the shade of the background image by applying a foreground color lightening process to the foreground data,
generating a plurality of color coefficient series, one series per frequency band, by applying discrete wavelet transformation to each of the background data and foreground data; and
applying a brightness coefficient increasing process only to a color coefficient series corresponding to a relatively lowest frequency band, wherein, as an original brightness coefficient positively relatively increases, a growth rate of the increased brightness coefficient relatively decreases.

21. The image data processing method as claimed in claim 20, wherein the background image and the foreground image are lightened by increasing
brightness of the background and foreground images, respectively.

22. The image data processing method as claimed in claim 21, wherein the shades of the background image and the foreground image are lightened by increasing brightness while decreasing a color difference of the background image and the foreground image, respectively.

23. The image data processing method as claimed in claim 22, wherein the background color lightening process and the foreground color lightening process are executed in such a manner that as an original brightness decreases, a growth rate of a correspondingly increased brightness increases and as an original color difference increases a growth rate of a correspondingly decreased color difference decreases.

* * * * *